United States Patent [19]

Peter et al.

[11] 3,912,712
[45] Oct. 14, 1975

[54] DISAZO DYESTUFFS OF THE DISPERSE SERIES WHEREIN TWO AZOBENZENE MOLECULES ARE LINKED TOGETHER

[75] Inventors: Richard Peter, Basel; Hans-Joerg Angliker, Reinach, both of Switzerland

[73] Assignee: Ciba-Geigy AG, Basel, Switzerland

[22] Filed: Mar. 11, 1974

[21] Appl. No.: 449,877

Related U.S. Application Data

[63] Continuation-in-part of Ser. No. 133,698, April 13, 1971, abandoned, which is a continuation-in-part of Ser. No. 693,703, Dec. 27, 1967, abandoned.

[30] Foreign Application Priority Data
Jan. 4, 1967 Switzerland.............................. 77/67
May 26, 1967 Switzerland......................... 7468/67
Dec. 11, 1967 Switzerland....................... 17307/67

[52] U.S. Cl. ............ 260/184; 106/288 Q; 260/152; 260/157; 260/158; 260/165; 260/174; 260/186; 260/187; 260/309.6; 260/309.7; 260/463; 260/465 D; 260/465 E; 260/471 C; 260/475 R; 260/480 C; 260/482 B; 260/485 J; 260/562 P; 260/570 R; 260/570.5 P; 260/570.6; 260/570.7

[51] Int. Cl.$^2$ .................... C09B 33/06; C09B 33/12; C09B 43/12; C09B 43/14

[58] Field of Search ........... 260/174, 184, 178, 186, 260/187, 190, 191

[56] References Cited
UNITED STATES PATENTS

| | | | |
|---|---|---|---|
| 2,813,852 | 11/1957 | Grandjean et al.................. | 260/144 |
| 2,945,848 | 7/1960 | Cole.................................... | 260/172 |
| 3,148,181 | 9/1964 | Wallace et al...................... | 260/207 |
| 3,211,717 | 10/1965 | Thomas .............................. | 260/160 |
| 3,271,383 | 9/1966 | Yamaya et al...................... | 260/158 |
| 3,415,809 | 12/1968 | Fisher et al......................... | 260/158 |
| 3,446,791 | 5/1969 | Dale et al. .......................... | 260/184 |
| 3,635,940 | 1/1972 | Hegar et al. ........................ | 260/155 |
| 3,642,764 | 2/1972 | De Montmollin et al. ......... | 260/153 |

*Primary Examiner*—Floyd D. Higel
*Attorney, Agent, or Firm*—Joseph G. Kolodny; Edward McC. Roberts; Michael W. Glynn

[57] ABSTRACT

Disazo dyestuffs wherein two N,N-dialkyl-p-phenylazoaniline dyestuff radicals are linked to each other via an N-alkyl group of the formula $$D_1-N=N-\text{Ar}(d_1)(c_1)-N(R_1)-R_3-Z-R_4-N(R_2)-\text{Ar}(d_2)(c_2)-N=N-D_2$$

wherein
$D_1$ and $D_2$ are each the residue of a diazo component of the benzene series;

$R_1$ and $R_2$ are hydrogen, alkyl or substituted alkyl;

$c_1$, $c_2$, $d_1$ and $d_2$ each represent hydrogen, methyl, ethyl, methoxy, ethoxy, phenylthio or phenoxy;

$R_3$ and $R_4$ are each alkylene of up to 3 carbon atoms, $$-CH_2-CH(OCOCH_3)-CH_2- \text{ or } -CH_2-CH(OH)-CH_2-;$$

such that where $R_3$ and $R_4$ are each $$-CH_2-CH(OCOCH_3)-CH_2- \text{ or } -CH_2-CH(OH)-CH_2-,$$

Z is $$-N(R_5)-$$

where $R_5$ is p-tolyl, p-methylcarbonylaminophenyl, phenyl, or
$C_1$-$C_3$ alkyl or
Z is -X'-Z'-X'-
wherein X' is —O— or —NH— and Z' is $$-C(=O)-, \quad -C(=O)-C_6H_4-C(=O)- \quad \text{or}$$
$$-C(=O)-(C_1-C_8 \text{ alkylene})-C(=O)-;$$

and
where $R_3$ and $R_4$ are not each $$-CH_2-CH(OCOCH_3)-CH_2-$$

or $$-CH_2-CH(OH)-CH_2-,$$

Z is $-O-C(=O)-O-$, $-O-C(=O)-C_6H_4-C(=O)-O-$ or $$-C(=O)-(C_1-C_8 \text{ alkylene})-C(=O)-$$

are disclosed. Such dyestuffs are suitable for dyeing and printing synthetic fibers.

5 Claims, No Drawings

DISAZO DYESTUFFS OF THE DISPERSE SERIES WHEREIN TWO AZOBENZENE MOLECULES ARE LINKED TOGETHER

CROSS-REFERENCE TO A RELATED APPLICATION

This application is a continuation-in-part of application Ser. No. 133,698, filed Apr. 13, 1971 now abandoned; Application Ser. No. 133,698 is in turn a continuation-in-part of application Ser. No. 693,703 filed Dec. 27, 1967, now abandoned.

The present invention provides new and valuable disazo dyestuffs of the formula (1) 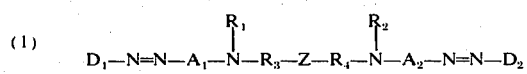

in which $D_1$ and $D_2$ each are the residue of a diazo component of the aniline series. $R_1$ is hydrogen, alkyl containing up to 10 carbon atoms or alkyl containing up to 10 carbon atoms substituted by a member selected from the group consisting of chlorine, bromine, phenyl, $C_1$-$C_{10}$-fatty acid acyloxy, $C_1$-$C_{10}$-fatty acid acylamino, hydroxy, cyano, $C_1$-$C_4$-alkoxy, benzoyl, cyanethoxy, $C_2$-$C_7$-alkyl-carbamoyl, aminocarbonyl and $C_2$-$C_7$-alkyloxycarbonyloxy, $R_2$ is alkyl containing up to 10 carbon atoms or alkyl containing up to 10 atoms substituted by a member selected from the group consisting of chlorine, bromine, phenyl, $C_1$-$C_{10}$-fatty acid acyloxy, $C_1$-$C_{10}$-fatty acid acylamino, hydroxy, cyano, $C_1$-$C_4$-alkoxy, benzoyl, cyanethoxy, $C_2$-$C_7$-alkylcarbamoyl, aminocarbonyl and $C_2$-$C_7$-alkyloxycarbonyloxy, alkoxy, benzoyl and cyanethoxy, $R_3$ and $R_4$ are each selected from the group consisting of alkylene containing up to 3 carbon atoms, a residue of the formula

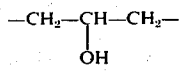

and a residue of the formula

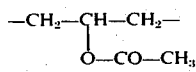

$A_1$ and $A_2$ each stands for a para-phenylene residue which may be substituted by members of the group consisting of alkyl containing up to 2 carbon atoms, alkoxy containing up to 2 carbon atoms and alkylcarbonylamino containing up to 5 carbon atoms, Z is selected from the group consisting of a. -X'-Z'-X'- wherein X' is —O—, -NH- or —N(CH$_3$)—and Z is the residue of a dicarboxylic acid containing up to 20 carbon atoms, the residue of a dicarbamic acid containing up to 15 carbon atoms, or a residue of the formula

b. the residue of a diglycidyl epoxy resin, the two glycidyl groups of which are abstracted, with the proviso that the groups $R_3$ and $R_4$ are N,β-hydroxypropylene and N,β-acetoxypropylene, said dyestuffs being free from sulfonic acid groups.

When the residues of the monoazo dyestuffs are bound through the group A, the acyl group is preferably a member of the organic chain joining groups $R_3$ and $R_4$.

When the residues of the monoazo dyestuffs are bound through the group E, the residues $R_3$ and $R_4$ bound to the nitrogen atoms of the monoazo dyestuffs which direct coupling are β-hydroxyethyl groups which are formed by addition of the two oxirane groups of the diopoxy compounds to the amino groups which direct coupling and which contain at least one reactive hydrogen atom.

Of the dyestuffs which are bound through a bridging group of the formula —R$_3$—(A)$_{\overline{p-1}}$(E)$_{\overline{2-p}}$R$_4$—, special mention is made of those in which the residues of the formula $D_1$ and/or $D_2$ are quaternated.

The new dyestuffs may be obtained, for example, either by a) reacting azo dyestuffs of the formulae $D_1$-N=N-$A_1$-NH-$R_1$ and $D_2$-N=N-$A_2$-NH-$R_2$ which contain a reactive hydrogen atom bound to an amino group, with a bifunctional compound of the formula

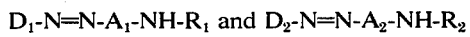

in which n stands for 1 or 2 and Y represents a reactive negative residue, preferably a halogen atom, when n = 2, and a reactive residue of the formula -CH=CH$_2$ or

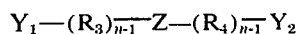

capable of additive combination when n= 1, to form the dyestuffs of the invention of the formula (1), or b) reacting the dyestuffs of the formulae

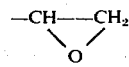

in which $X_1$ and $X_2$ each represents a group containing at least one reactive hydrogen atom, preferably an amino, mercapto or hydroxyl group, or a reactive derivative thereof, or an exchangeable halogen atom or a carboxylic acid group or a reactive derivative thereof, with the bifunctional compound of the formula Z' to form the dyestuffs of the invention of the formula (1), or c) reacting the dyestuffs of the formulae

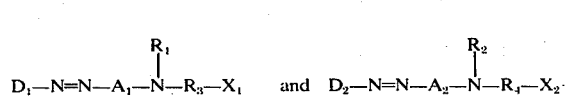

in which $E_1$ and $E_2$ represent groups containing reactive oxirano groups, preferably glycidyl residues, or groups containing double bonds capable of additive reaction, with a bifunctional reactive compound to form the dyestuffs of the invention of the formula (1); or d) reacting the coupling components of the formulae

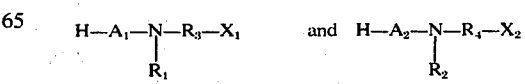

with the bifunctional reactive compound of the formula Z' to form the compounds of the formula $$H-A_1-NR_1-R_3-Z-R_4-NR_2-A_2-H$$

and then coupling them with the diazonium compounds of the diazo components $D_1-NH_2$ and $D_2-NH_2$ to form the disazo compound of the formula (1), or e) oxidizing the azo dyestuffs of the formulae $$D_1-N=N-A_1-\overset{R_1}{\underset{|}{N}}-R_3-X_1 \quad \text{and} \quad D_2-N=N-A_2-\overset{R_2}{\underset{|}{N}}-R_3-X_2$$

which are indicated under b), to form a dyestuff of the formula (1), which may done when $X_1$ and $X_2$ in the above formulae each represents an SH group; in which case Z then represents a bridging group of the formula —S—S—. If desired, the disazo dyestuffs so obtained may be quaternated at one of the residues $D_1$ or $D_2$ when the latter contain groups capable of quaternation; this may be effected in the customary manner with an alkylating agent, or, if desired, at least a molar proportion of an already quaternated diazonium compound may be used when coupling with the bifunctional coupling component.

The components represented by A, B, $R_1$ and $R_2$, as well as $R_3$ and $R_4$ may be identical, with the result that symmetrical disazo dyestuffs are obtained, or starting materials may be used in which one or more of these components are different so that mixtures of disazo dyestuffs are obtained.

The new dyestuffs are preferably free from sulphonic acid groups. When they do not contain quaternated groups they are either insoluble or sparingly soluble in water and belong to the "disperse" class of dyestuffs. Dyestuffs of this group which are specially preferred are those in which the diazo component does not contain nitrogen atoms capable of quaternation and which is derived, for example, from a negatively substituted aniline.

However, when the dyestuffs contain quaternated diazo components of the formula $D_1$ and/or $D_2$, they are soluble in water and must not contain carboxylic or sulphonic acid groups.

Mixtures of disazo and monoazo dyestuffs that may also be mentioned are those obtained by coupling a bifunctional coupling component of the above mentioned formula $H-A_1-NR_1-R_3-Z-R_4-NR_2-A_2-H$ with less than 2 mols of a diazo compound of the formula D-N=N-Cl.

Azo dyestuffs that may be mentioned as being suitable for processes a) and b) are those obtained by coupling diazo compounds of amines free from carboxyl and sulphonic acid groups, preferably those belonging to the aromatic or heterocyclic series, with any desired coupling components free from carboxyl and sulphonic acid groups, it being essential that the coupling component contain an active NH group or a reactive atom bound to an N-alkyl residue or a reactive group of the kind defined above.

The diazo residues $D_1$ and $D_2$ may be aromatic residues which are preferably free from heterocyclic rings and/or hetero atoms capable of quaternation. However, the said residues may also be capable of quaternation or they may be quaternated. When the monoazo dyestuffs are to be reacted afterwards with bifunctional alkylating or acylating agents to form the disazo dyestuffs, the residue D must also be free from reactive acylatable or alkylatable hydrogen atoms. When coupling is carried out in the last step, $D_1$-N=N-Cl and $D_2$-N=N-Cl are general identical.

The diazo components to be used according to this invention generally correspond to the formula $$A-NH_2$$

wherein A is phenyl optionally substituted by chloro or bromo atoms or by hydroxyl, cyan, thiocyanato, nitro, $C_1$-$C_2$-alkyl (such as methyl or ethyl), trifluoromethyl, $C_1$-$C_2$-alkoxy (such as methoxy or ethoxy), formyl, acetyl, propionyl, benzoxyl, methylbenzoyl, (methyl or ethyl)oxycarbonylbenzoyl, acetylamino, prionylamino, benzoylamino, methoxycarbonylamino, ethoxycarbonylamino, methylsufonyl, ethylsulfonyl, propylsulfonyl, chloromethylsulfonyl, aminosulfonyl, $C_1$-$C_2$-alkylated aminosulfonyl (such as methylaminosulfonyl, diethylaminosulfonyl), (hydroxyethyl)-aminosulfonyl, cyanoethylaminosulfonyl, β-chloroethylsulfonylamino, cyclohexylaminosulfonyl, phenylaminosulfonyl, (chloro-, methyl-, nitro-, or methoxyphenyl)aminosulfonyl, benzylaminosulfonyl, N-piperidylsulfonyl, N-morpholinosulfonyl, $C_1$-$C_3$-alkylsulfonyloxy (such as methylsulfonyloxy, ethylsulfonyloxy, propylsulfonyloxy), ethoxyethylsulfonyloxy, cyclohexylsulfonyloxy, chloromethylsulfonyloxy, cyanethylsulfonyloxy, phenylsulfonyloxy, chlorophenylsulfonyloxy, aminosulfonyloxy, $C_1$-$C_4$-alkylated aminosulfonyloxy (such as ethylaminosulfonyloxy, butylaminosulfonyloxy, dibutylaminosulfonyloxy, diethylaminosulfonyloxy), phenylaminosulfonyloxy, N-phenyl-N-ethyl-aminosulfonyloxy, phenyl, acetylaminophenyl, trimethylammoniummethyl-carbonyl, phenoxy, phenylazo or nitrophenylazo groups.

A valuable class of dyestuffs are those wherein the diazo component A is a phenyl residue which contains at least one electro-negative (electron-attracting) substituent. Such substituents are characterized by a positive Hammet-value as defined in British Spec. No. 1,098,654, or by Jaffe, Chemical Reviews, Vol. 53, page 191 (particularly at pages 219–233), and H. C. Brown et al., J.Am.Chem. Soc., vol. 80, pages 4979–4987 (1958), especially in table No. 1.

Another selection of diazo components to be used according to this invention preferably correspond to the formula

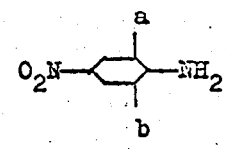

in which a represents a hydrogen or a halogen atom or an alkyl, alkoxy, phenoxy, nitro, cyano, carbalkoxy or alkylsulphone group and b represents a hydrogen or a halogen atom or an alkyl, cyano or trifluoromethyl group.

The following are given as examples:- aminobenzene, 1-amino-4-chlorobenzene, 1-amino-4-bromobenzene, 1-amino-4-methylbenzene, 1-amino-4-nitrobenzene, 1-amino-4-cyanobenzene, 1-amino-2,5-dicyanobenzene, 1-amino-4-methylsulphonylbenzene, 1-amino-4-carbalkoxybenzene, 1-amino-2,4-dichlorobenzene, 1-amino-2,4-dibromobenzene, 1-amino-2-methyl-4- chlorobenzene, 1-amino-2-trifluoromethyl-4-chlorobenzene, 1-amino-2-cyano-4-chlorobenzene, 1-amino-2-carbomethoxy-4-chlorobenzene, 1-amino-2-carbomethoxy-4-nitrobenzene, 1-amino-2-chloro-4-cyanobenzene, 1-amino-2-chloro-4-nitrobenzene, 1-amino-2-chloro-4-carbothoxybenzene, 1-amino-2-chloro-4-methylsulphonylbenzene, 1-amino-2-methylsulphonyl-4-chlorobenzene, 1-amino-2-methylsulphonyl-4-nitrobenzene, 1-amino-2,4-dinitrobenzene, 1-amino-2,4-dicyanobenzene, 1-amino-2-cyano-4-methylsulphonylbenzene, 1-amino-2,6-dichloro-4-cyanobenzene, 1-amino-2,6-dichloro-4-nitrobenzene, 1-amino-2,4-dicyano-6-chlorobenzene, 1-amino-2,4-dinitro-6-chlorobenzene and especially 1-amino-2-cyano-4-nitrobenzene; also 1-aminobenzene-2-, -3- or -4-sulphonic acid amides, for example, N-methyl- or N,N-dimethyl- or -diethyl amido.

Amines from the series of heterocyclic diazo components are preferably used when the group and contains an acyl group or especially the diacyl residue of a difunctional acid, or at least two 2-(hydroxy or acyloxy)-propylene-1,3-groups.

The heterocyclic diazo component may be any desired diazotizable heterocyclic amine which is free from acidic substituents imparting solubility in water, but especially the amines which contain a five-membered heterocyclic ring having 2 or 3 hetero atoms, especialy one nitrogen atom and one or two sulphur, oxygen or nitrogen atom(s).

The following are given as examples of heterocyclic diazo components:- 2-aminothiazole, 2-amino-5-nitrothiazole, 2-amino-5-methylsulphonylthiazole, 2-amino-5-cyanothiazole, 2-amino-4-methyl-5-nitrothiazole, 2-amino-4-methylthiazole, 2-amino-4-phenylthiazole, 2-amino-4-(4'-chloro)-phenylthiazole, 2-amino-4-(4'-nitro)-phenylthiazole, 3-aminopyridine, 3-aminoquinoline, 3-aminopyrazole, 3-amino-1-phenylpyrazole, 3-aminoindazole, 3-amino-1,2,4-triazole, 5-(methyl-, ethyl-, phenyl-or benzyl-)1,2,4-triazole, 3-amino-1-(4'-methoxyphenyl)pyrazole, 2-aminobenzthiazole, 2-amino-6-methylbenzthiazole, 2-amino-6-methoxybenzthiazole, 2-amino-6-chlorobenzthiazole, 2-amino-6-cyanobenzthiazole, 2-amino-6-thiocyanothiazole, 2-amino-6-nitrobenzthiazole, 2-amino-6-carboethoxybenzthiazole, 2-amino-(4- or 6)-methylsulphonyl-benzthiazole, 2-amino-1,3,4-thiadiazole, 2-amino-1,3,5-thiadiazole, 2-amino-4-phenyl- or 4-methyl-1,3,5-thiadiazole, 2-amino-5-phenyl-1,3,4-thiadiazole, 2-amino-3-nitro-5-methylsulphothiophene, 2-amino-3,5-bis(methylsulpho)-thiophene, 5-amino-3-methylisothiazole, 2-amino-4-cyanopyrazole, 2-(4'-nitrophenyl)-3-amino-4-cyanopyrazole and 3- or 4-aminophthalimide.

In addition to the above heterocyclic diazo components which are capable of quatornation, the following diazo components capable of quaternation are of interest:- mota-di-(methyl or ethyl)-aniline and para-aminobenzcic acid-N-[motadi-(methyl or ethyl)-aminophenyl]-amide.

Diazotization of the above-mentioned diazo components may be carried out by known methods, for example, with a mineral acid and sodium nitrite, or, for example, with a solution of nitrosylsulphuric acid in concentrated sulphuric acid.

Coupling may also be carried out in known manner, for example, in a neutral to acid medium, if necessary, in the presence of sodium acetate or a similar buffer which influences the rate of coupling, or a catalyst, for example, dimethylformamide or pyridine or a salt thereof.

Coupling may also be effected advantageously by combining the components in a mixing nozzle. By "mixing nozzle" is meant a device in which the liquids to be mixed are combined with one another in a comparatively small space, whereby at least one of the liquids is conducted through a nozzle, preferably under pressure. The mixing nozzle may be constructed and operated, for example, on the principle of the water jet pump, the supply of one of the liquids to the mixing nozzle corresponding to the supply of water in the water jet pump, and the supply of the other liquid corresponding to the connexion between the water jet pump and the vessel to be evacuated; feed of the liquid through the latter supply route may also be effected under pressure.

However, it is also possible to use other devices to effect rapid and, if necessary, continuous mixture in a small space.

After coupling, the non-quaternated dyestuffs that are formed can easily be separated from the coupling mixture, for example, by filtration, because they are virtually insoluble in water. When the dyestuffs obtained are quaternated, they may be salted out.

The residues $A_1$ and $A_2$ of the coupling components are naphthylene and especially phenylene groups bound in 1,4-position and which preferably do not contain alkylatable or acylatable hydroxy, mercapto or primary or secondary amino groups.

Examples that may be mentioned are 1,4-phenylene groups of the formulae

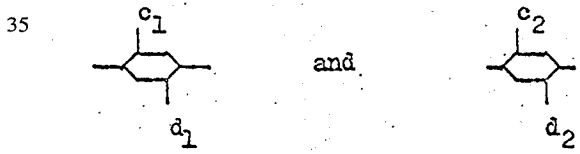

in which $c_1$, $c_2$, $d_1$ and $d_2$ each represents a hydrogen atom or a methyl, ethyl, methoxy, ethoxy, thiophenoxy, or phenoxy residue.

The groups $c_1$ and $c_2$ are preferably bound in orthoposition to the azo group and, in addition to the above-mentioned groups, may also represent a chlorine or a bromine atom, a trifluoromethyl group, an alkylsulphonyl group, preferably a methylsulphonyl group, or an acylamino group that may be alkylated, preferably methylated, at the nitrogen atom, and in which the acyl residue is the residue of an organic monocarboxylic acid, such as propionic, formic or butyric acid, or of an organic monosulphonic acid, for example, methane-, ethane- or para-toluene-monosulphonic acid, or of a carbamic or carbonic acid monoester or monoamide, for example, phenoxycarbonyl, methoxycarbonyl or aminocarbonyl.

The groups $d_1$ and $d_2$ are preferably in ortho-position to the amino group directing coupling.

The groups $R_1$ and $R_2$ may be hydrogen atoms or low alkyl groups containing 1 to 4, but preferably 2 to 4, carbon atoms, for example, methyl, ethyl, n-propyl or n-butyl groups which may be substituted in the usual manner, for example, halogenated alkyl groups, for example, $\beta$-chloroethyl, $\beta,\beta,\beta$-trifluoroethyl or $\beta,\gamma$-dichloropropyl groups, $\beta$-cyanoethyl groups, alkoxyalkyl groups, for example, $\beta$-ethoxyethyl or $\delta$-methoxybutyl groups, hydroxyalkyl groups, for example, $\beta$- hydroxyethyl or β,γ-dihydroxypropyl groups, phenylalkyl groups, such as benzyl or phenylethyl groups, carbalkoxy groups, for example, hydrocarbylcarbonyloxyalkyl groups containing up to 16 carbon atoms, preferably up to 7 carbon atoms, such as acetyloxyethyl, butyryloxyalkyl, formyloxyalkyl, p-phenoxybenzoyloxy alkyl or benzoyloxyalkyl, β-or γ-carbo-(methoxy- or ethoxy)-propyl groups, acylaminoalkyl groups, for example β-(acetyl- or formyl)-aminoethyl groups, β-(alkyl- or aryl)- sulphonylalkyl groups, for example, β-methanesulphonylethyl, β-ethanesulphonylethyl or β-(para-chlorobenzenesulphonyl)- ethyl groups, alkyl- or arylcarbamoyloxyalkyl groups, for example, β-methylcarbamyloxyethyl or β-phenylcarbamyloxyethyl groups, alkyloxy-carbonyloxyalkyl groups, for example, β-(methoxyl-, ethoxy- or isopropyloxy)-carbonyloxyethyl groups, and γ-acetamidopropyl, β-(para-nitrophenoxy)-ethyl, β-(para-hydroxyphenoxy)-ethyl, β-(β' -acetylethoxycarbonyl)-ethyl, β-[β'-(cyano-, hydroxy-, methoxy- or acetoxy)-ethoxycarbonyl]- ethyl, cyanoalkoxyalkyl, β-carboxyethyl, β-acetylethyl, β-diethylaminoethyl and β-cyanoacetoxyethyl groups. These groups generally contain not more than eight, but preferably not more than six, carbon atoms.

The groups $R_3$ and $R_4$ are alkylene groups that may be substituted, for example, unsubstituted ethylene groups, or, in accordance with a special embodiment of the invention, alkylene groups hydroxylated in β-position to the amino group directing coupling, which alkylene groups may also comprise part of an alicyclic ring system. The latter are formed, for example, in the two-sided reaction between diepoxides, especially diglycidyl compounds, and the amino groups of the coupling components which direct coupling and which carry at least one reactive hydrogen atom, or the corresponding azo dyestuffs which are formed. The hydroxyl groups in β-position which are formed may be substituted, whereby the substituents, together with the hydroxyethyl groups which lead to the nitrogen atom directing coupling, may have the same meaning as the groups $R_1$ and $R_2$ defined above, provided they are derivatives of an N-hydroxyethyl group starting from the nitrogen atom which directs coupling.

When the residue $R_1$ or $R_2$ in the dyestuffs of the invention is bound to the para-phenylene residue of the corresponding coupling component $R_1$ or $R_2$ in ortho-position to form a ring, the coupling component used, for example, is tetrahydroquinoline or benzmorpholine or derivatives thereof.

Suitable coupling components of this kind are, for example, 1,2,3,4-tetrahydroquinolines (generally abbreviated to tetrahydroquinolines) and benzomorpholines, for example, tetrahydroquinoline, N-β-hydroxyethyltetrahydroquinoline, N-β,γ-dihydroxypropyltetrahydroquinoline, N-β,γ-dihydroxypropyl-7-methoxytetrahydroquinoline, N-β,γ-dihydroxypropyl-5-acetylaminotetrahydroquinoline, N-β-hydroxyethyl-2,2,4-trimethyltetrahydroquinoline, N-β-hydroxyethylbenzomorpholine and N-β,γ-dihydroxypropyl-5-acetylaminobenzemorpholine.

When residue $R_3$ and residue $R_4$ each represents a methylene group, the group Z forms an alkylene residue of the formula $-CHX_3-$, in which $X_3$ represents a hydroxyl group or a bromine or a chlorine atom.

Preferably, the nitrogen atoms directing coupling are connected through at least 5 atoms.

Substituted anilines, which may be used in the synthesis of bifunctional coupling components in accordance with process c), are, for example, the following compounds, in which the group X has the same meaning as $X_1$ and $X_2$ above:-

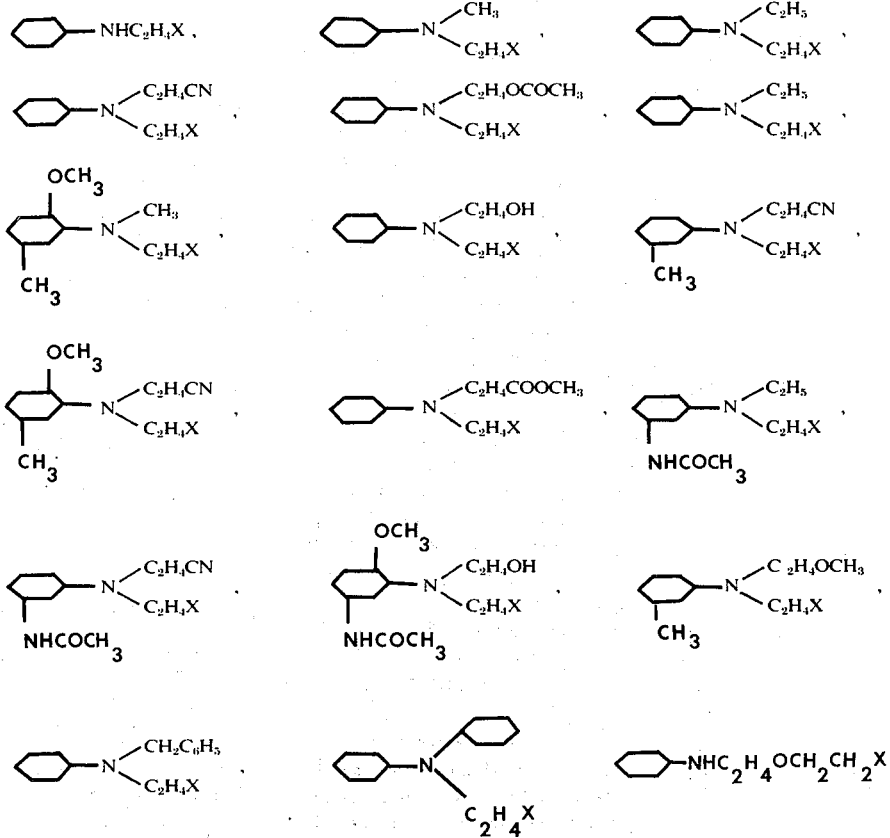

-continued

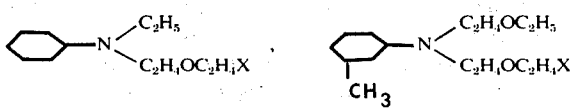

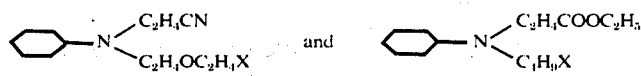

The bridging group Z which has no dyestuffs characteristics is principally a group corresponding to one of the following formulae:-
—O—, —S—, —S-S—, —NH—,

—SO—, —NHCH$_2$CH$_2$NH—,

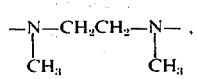

—O-CH$_2$-CH$_2$-NH-CH$_2$-CH$_2$-O— or —O-R$_5$-O—, in which R$_5$ is a divalent aliphatic, cyclo- or araliphatic or aromatic residue in which the carbon chain may be interrupted by hetero atoms, especially oxygen atoms, preferably a residue of the formula

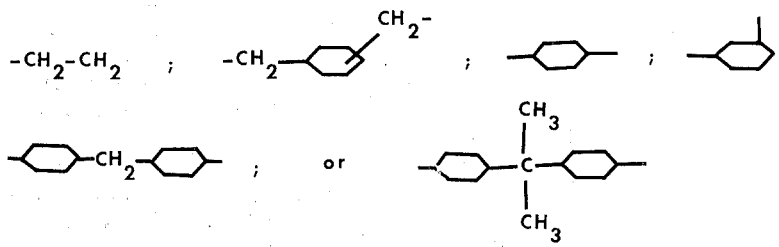

especially groups containing acyl residues which correspond to the formulae -OCO-, -OCOO-, -OCOCOO-, -NHCO-, -CONH-, -CONHCO, -CONHNHCO- and -NHCOCONH-, as well as the colourless connecting group of the formula -X'CO-R$_6$-COX'-, in which X' represents an oxygen or a sulphur atom or an -NH group and R$_6$ represents an aliphatic, cycloaliphatic, aromatic or heterocyclic residue, preferably an ethylene or a para-, meta- or ortho-phenylene residue, the colourless connecting group of the formula -X'-CO-NH-R$_7$-NH-CO-X'-, in which X' represents an oxygen or a sulphur atom or an NH- group and R$_7$ represents an aliphatic, cycloaliphatic, araliphatic, aromatic or heterocyclic residue of a diisocyanate, preferably an ethylene, hexamethylene, paraphenylene or toluylene residue, or a residue of the formula

—⟨⟩— CH$_2$ —⟨⟩— the colourless connecting group of the formula —OCOX'-R$_8$-X'OCO—, in which X' has the meaning given above and R$_8$ represents a divalent organic residue, especially an aliphatic, araliphatic, cycloaliphatic, aromatic or heterocyclic residue, which may be interrupted by the groups X'; when X' is an NH- group, R$_8$ has the same meaning as R$_7$, and the colourless connecting group of the formula -X''SO$_2$-R$_9$ -SO$_2$X''-, in which X'' represents an oxygen or a nitrogen atom (the nitrogen atom may be substituted) and R$_9$ represents an aliphatic or aromatic residue.

The connecting group Z is introduced as follows:-

The linkage with dicarboxylic acid esters is effected by known methods, for example, by esterification, especially with azeotropic elimination of water, by transesterification with elimination of a volatile alcohol or phenol or by reaction with dicarboxylic acid anhydrides, by reaction with dicarboxylic acid halides, whereby the tertiary amino group present in the coupling component may take up the hydrogen halide that is liberated. In addition to the purely organic acid chlorides, the phosphorus-organic alkanephosphoric acid dichlorides may also be used, for example, ethane- or cyclohexanephosphonic acid dichloride. To prepare the dicarbamic acid esters, reaction is further effected with diisocyanates, when the group X is a hydroxyl group, it being advantageous to carry out the reaction either in an inert solvent or without a solvent at a moderate temperature; however, an active solvent may also be used.

Also included in the class of organic acid chlorides is phosgene, with which the carbonates are obtained; a method of carrying out the reaction is first to react the hydroxyl group of the dyestuff component with at least one mol of phosgene to form the chloroformic acid ester and then to additively combine the ester with a diol or an unsubstituted or partially substituted diamine. However, the carbonic acid esters may also be prepared by reaction with dialkyl or diaryl carbonates.

When X is an amino group containing at least one active hydrogen atom, the corresponding dicarboxylic acid amides are obtained preferably by reaction with dicarboxylic acid halides, and the corresponding phosphoric acid diamides are obtained by reaction with alkanephosphoric acid dichlorides. The corresponding ureas are obtained by reaction with diisocyanates. The corresponding bis-carbamic acid esters are obtained by reacting the dyestuff component with an equimolar amount of a bis-chloroformic acid ester.

When Z is the residue of a dicarboxylic acid, the following free acids, or the halides and anhydrides thereof (if the acid is capable of forming an anhydride) or esters thereof with volatile alcohols, are used as starting materials serving as bifunctional reactants corresponding to the group X:- oxalic acid, succinic acid, malonic acid, pimelic acid, adipic acid, methyladipic acid, azelaic acid, sebacic acid, maleic acid, fumaric acid, chlorofumaric acid, allylsuccinic acid, dodecylsuccinic acid, diglycollic acid, methylene-bis-thioglycollic acid, 2,3-dibromsuccinic acid, thiodibutyric acid, tetrahydrophthalic acid, hexahydrophthalic acid, endomethylenetetrahydrophthalic acid, methylenendomethylenetetrahydrophthalic acid, hexacloroendomethylenetetrahydrophthalic acid, phthalic acid, isophthalic acid, terephthalic acid, 2,5-thiophenedicarboxylic acid, furandicarboxylic acid and the dicarboxylic acids of the formulae

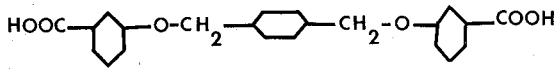

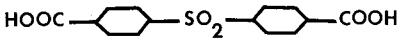

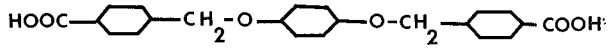

For linkage with the acyl residue of a disulphonic acid there are used the halides of aliphatic and especially aromatic disulphonic acids.

Aliphatic, cycloaliphatic, araliphatic, aromatic or heterocyclic diisocyanates are suitable as diisocyanate components that form the colourless connecting group Z by reaction with 2 mols of the dyestuff component of the formula $D_1$-N=N-$A_1$-$NR_1$-$R_3$-X. The following are given as examples:- hexamethylenediisocyanate, N,N'-bis-(4-methyl-3-isocyanatophenyl) urea, cyclohexane-1,4-diisocyanate, isophorone diisocyanate, 1,2,3,4,5,6-hexahydrodiphenylmethane-4,4'-diisocyanate, and also aromatic diisocyanates, for example, toluene-2,4- or -2,6-diisocyanate or mixtures thereof, phenylene-1,4-diisocyanate bis-(4-methyl-3-isocyanatophenyl)-carbodiimide, diphenyl-4,4'-diisocyanate, diphenylmethane-4,4'-diisocyanate, diphenylmethane 3-3'-diisocyanate, diphenyldimethylmethane-4,4'-diisocyanate, stilbene-4,4'-diisocyanate, benzophenone-4,4'-diisocyanate, diphenylether- or diphenylsulphide-diisocyanate, as well as the substitution products thereof, for example, with derivatives substituted by alkyl, alkoxy, halogen or nitro groups, for example, 3,3'-dimethyl- or 3,3'-dimethoxy- or 3,3'-dichlorodiphenylmethane-4,4'-diisocyanate. Further examples are diisocyanates of the naphthalene series, for example, naphthylene-1,5-diisocyanate, or heterocyclic diisocyanates, for example, those of benzofuran or urea, and diisocyanates containing uretdione groups, for example, 1,3-bis-(4'methyl-3'-isocyanatophenyl)-uretdione.

Symmetrical diisocyanates, for example, diphenyl-4,4'-or diphenylmethane-4,4'-diisocyanate, are preferred.

If desired, the diisocyanates may also be prepared in situ, for example, by reacting bis-chloromethylbenzenes and sodium or lead cyanate in an active solvent.

The manufacture of the carbonates when X is a hydroxyl group may be carried out either by effecting the reaction directly with phosgene to form the carbonate, if necessary, in the presence of a quaternary ammonium base or salt, or by first producing the chloroformic acid ester of an azo dyestuff residue and reacting it either with the same azo dyestuff residue or with a further azo dyestuff residue containing a free hydroxyl group to form the carbonate. On the other hand, 2 mols of the chloroformic acid ester may be reacted, preferably in the presence of a hydrogen chloride acceptor, for example, pyridine, with 1 mol of a diol, a diamine or a dithiol to form the diurethane, bis-(thiourethane) or bis-urea compound.

The following hydroxyl compounds are given as examples of suitable divalent aliphatic, cycloaliphatic, araliphatic or aromatic hydroxyl compounds in which the hydrocarbon skeletal structure may be interrupted by hetero atoms:- 1,2-dihydroxyethane, 1,2- or 1,3-dihydroxypropane, 1,2- or 1,3- or 1,4- or 2,3-dihydroxybutane, 1,2- or 1,3- or 1,4- or 1,5- or 2,3- or 2,4- dihydroxypentane, the corresponding dihydroxyhexanes, heptanes, -octanes, -nonanes, -decanes, -undecanes, -dodecanes, -hexadecanes and --octadecanes, 1,4-dihydroxybutene, 1,4-dihydroxy-2-methylbutane, 1,5-dihydroxy-2,2-dimethylpentane, 1,5-dihydroxy-2,2,4-trimethylpentane, di-($\beta$-hydroxyethyl)-thioether, di-($\beta$-hydroxyethyl)-ether (= diglycol), triglycol, cyclohexanediol-1,2- or 1,3- or 1,4, 4,4'-dihydroxydicyclohexylmethane, 4,4'-dihydroxydicyclohexylmethylmethane, 4,4'-dihydroxydicyclohexyldimethylmethane, 4-hydroxybenzylalcohol, 1,4-di-($\beta$-hydroxyethoxy)-benzene, 1,2- or 1,3- or 1,4-dihydroxybenzene, --methyl-2,4- (or 2,3- or 3,4- or 2,6- or 2,5- or 3,5)-dihydroxybenzene, 1,3-dimethyl-2,4- (or -4,6-)-dihydroxybenzene, 1,4-dimethyl-2,5-dihydroxybenzene, 1-ethyl-2,4-dihydroxybenzene, 1-isopropyl-2,4-dihydroxybenzene, 4,4'-dihydroxyazobenzene, 2,4- or 4,4'-dihydroxydiphenylether, 2,2'-dihydroxyethyleneglycoldiphenylether, 1,3- or 1,4- or 1,5- or 1,6- or 1,7- or 1,8- or 2,6- or 2,7- dihydroxynapththalene, 4,4'-dihydroxydiphenylamine, 2,4'- or 4,4'-dihydroxydiphenyl, 4,4'-dihydroxydiphenylmethane, 4,4'-dihydroxydiphenylmethylmethane, 4,4'-dihydroxydiphenyldimethylmethane, 1,1'-di-(4'-hydroxyphenyl)-cyclohexane, 4,4'-dihydroxydiphenyl-(di)-sulphide and 4,4'-dihydroxydiphenylsulphone or mixtures of such diols.

Instead of diols, dithiols may be used, especially aliphatic, araliphatic and aromatic dithiols, for example, 1,2-ethanedithiol, 1,3-propanedithiol, 1,6-hexanedithiol, 3,4-toluenedithiol and para-xylylenedithiol.

Suitable amines having two primary or secondary nitrogen atoms which may be reacted with 2 mols of the azo dyestuff chloroformic acid ester of the formula $D_1$-N=N-$A_1$-N-$R_3$-O-CO-Cl are 1,2-diaminoethane, 1,2- or 1,3-diaminopropane, 1,2- or 1,3-or 1,4- or 2,3-diaminobutane, 1,2- or 1,3- or 1,4- or 1,5- or 2,3- or 2,4-diaminopentane, the corresponding diaminohexanes, -heptanes, -octanes, -nonanes, -decanes, -undecanes, -dodecanes, -hexadecanes and -octadecanes, 1,4-diaminobutene, -1,4-diamino-2-methylbutane, 1,5-diamino-2,2-dimethylpentane, 1,5-diamino-2,2,4-trimethylpentane, di-($\beta$-aminoethyl)-thioether, di-($\gamma$-aminopropyl)-ether, di-($\gamma$-aminopropyl)-thioether, di-($\omega$-aminohexyl)-thioether, N,N'-dimethyldiaminoethane-1,2, N', N'-diethyldiaminoethane-1,2, 1-amino-3-methylaminopropane, isophoronediamine, piperazine, N-2-aminoethylpiperazine, 4-aminopiperidine, $\omega,\omega'$-diamino-1,3-(or -1,4)-dimethylbenzene, $\omega,\omega'$-diamino-1,4-(or -1,2)-dimethylcyclohexane, $\omega,\omega'$-diamino-1,4-diethylbenzene, $\omega,\omega'$-diamino-1,4- (or -1,5)-dimethylnaphthalene, ω,ω'-diamino-di-n-propylbiphenyl, 1,2- or 1,3- or 1,4-diaminocyclohexane, 1-methyl-2,4-diaminocyclohexane, 1-ethyl-2,4-diaminocyclohexane, 4,4'-diaminodicyclohexylmethane, 4,4'-diaminodicyclohexylmethylmethane, 4,4'-diaminodicyclohexyldimethylmethane, 4,4' -diamino-2,2'-dimethyldicyclohexylmethane, 4,4'-diamino-3,3'-dimethyldicyclohexylmethane, 4-aminobenzylamine, 2-(4'-aminophenyl)-1-aminoethane, 1-(3'-aminophenyl)-1-aminoethane, 3-(3'- or 4'-aminophenyl)-1-aminopropane, 3-(3'- or 4'-aminophenyl)-1-aminobutane, tetrahydronaphthylenediamine-1,5 or -1,4, hexahydrobenzidine-4,4'-diamine, hexahydrodiphenylmethane-4,4'-diamine, 1,2-, 1,3- or 1,4-diaminobenzene, 1-methyl-2,4- (or 2,3- or 3,4- or 2,6- or 2,5- or 3,5)-diaminobenzene, 1,3-dimethyl-2,4- (or -4,6)-diaminobenzene, 1,4-dimethyl-2,5-diaminobenzene, 1-ethyl-2,4-diaminobenzene, 1-isopropyl-2,4-diaminobenzene, diamino-diethylbenzene, diisopropyl-diaminobenzene, 1-chloro-2,4-diaminobenzene, 1,3-dichloro-2,4- (or -4,6)-diaminobenzene, 1,4-dichloro-2,5-diaminobenzene, 2,4- (or 4,4')-diaminodiphenylether, ethyleneglycoldiphenylether-2,2'-diamine, diethyleneglycoldiphenylether-2,2'-diamine, N,N'-dimethylphenylenediamine-1,3 or -1,4, N-methylphenylenediamine-1,4, 1,3- or 1,4- or 1,5- or 1,6- or 1,7- or 1,8- or 2,6- or 2,7-naphthylenediamine, 1,1'-dinaphthyl-2,2'-diamine, 4,4'-diaminodiphenylamine, 2,4'- or 4,4'-diaminodiphenyl, 3,3'-dimethyl-4,4'-diaminodiphenyl, 2,2'- or 3,3'-dichloro-4,4'-diaminodiphenyl, 4,4'-diaminodiphenylmethane, 4,4'-diaminodiphenylmethylmethane, 4,4'-diaminodiphenyldimethylmethane, 2,2'-dimethyl-4,4'-diaminodiphenylmethane, 1,1-di-(4'-aminophenyl)-cyclohexane, 1,1-di-(4'-amino-3'-methylphenyl)-cyclohexane, 3,3'-diaminobenzophenone, 2,4-diaminodiphenylethane-1,2, 4,4',4''-triaminotriphenylmethane, 4,4'-diamino-2,2',5,5'-tetramethyltriphenylmethane, 4,4'-diamino-2,2',5,5'-tetramethyl-2''-chlorotriphenylmethane, fluorenediamine-2,7,2,6-diaminoanthraquinone, 9-ethylcarbazole-3,6-diamine, pyrene-3,8-diamine, chrysene-2,8-diamine, benzidinesulphone-4,4'-diamine, diphenylsulphide-2,4-diamine, diphenyldisulphide-4,4'-diamine, diphenylsulphone-4,4'-diamine, diphenylmethanesulphone-4,4'-diamine, 4-methyl-3-aminobenzenesulphonic acid-(4'-aminophenyl)-ester, di(4-aminobenzenesulphonyl)-ethylenediamine-3,3'-dimethoxy-4,4'-diaminodibenzylthioether, 4,4'-dimethoxy-3,3'-diaminobenzenethioethyleneglycol and 3,3'-dimethoxy-4,4'-diaminobenzylsulphone.

In addition to dialcohols, dithiols and diamines, difunctional compounds may be used in which the two functional groups (of the kind defined above) are different from each other.

Dyestuffs containing ether bridges or the residue —O-$R_5$-O— as used in accordance with the invention may be obtained, for example, by reacting two molecules of a dyestuff of the formula $D_1$-N=N-$A_1$-$NR_1$-$R_3$-OH with one mol of a dihalide. Corresponding dyestuffs joined through amino bridging groups may be obtained by reacting two molecules of a dyestuff of the formula $D_1$-N=N-$A_1$-$NR_1$-$R_3$-$NH_2$ with one mol of a dihalide. When starting from dichlorides, it is advantageous to use dihalides having active chlorine atoms. Suitable dihalides are, for example, 1,4-dichlorobutene, di-β-chloroethylether, dichloroethylformaldehyde and the isomers of bis-(chloromethyl)-benzene.

Disazo dyestuffs in which two different monoazo dyestuff residues are joined together through an acyl group may be obtained, for example, by first reacting one molecule of a dyestuff of the formula $D_1$-N=N-$A_1$-$NR_1$-$R_3$-$X_1$, in which $X_1$ represents a mercapto, a primary or secondary amino or a hydroxyl group, with one molecule of a diisocyanate containing isocyanate groups of different reactivity, for example, 2,4-toluylenediisocyanate or isophoronediisocyanate, and then with one molecule of a dyestuff of the formula $D_2$-N=N-$A_2$-$NR_2$-$R_4$-$X_2$, in which $X_2$ has the same meaning as $X_1$.

Furthermore, a monoazo dyestuff of the formula $D_1$-N=N-$A_1$-$NR_1$-$R_3$-OH may be reacted with phosgene to form the chloroformic acid ester which is then reacted with a second monoazo dyestuff of the formula $D_2$-N=N-$A_2$-$NR_2$-$R_4$-X, in which X represents a mercapto, amino or hydroxyl group, to form the carbonic acid derivative.

When the two dyestuff residues of the formula D-N=N-A-$NR_1$-$R_3$-X', in which the reactive group X' in this case is preferably a carboxyl or an amino group, are reacted with a diepoxide, the terminal groups of the bridging group Z are likewise ether bridges; in this reaction, hydroxyl groups are simultaneously formed in β-position to the carbon atoms bound to the two ether bridges, their formation being brought about by the opening of the epoxy rings.

A further and specially preferred procedure for the preparation of dyestuffs or intermediates containing the group -$R_3$-Z-$R_4$-consists in the two-sided linkage of - consists azo dyestuff residues containing at least one active hydrogen atom bound to the nitrogen atom directing coupling, or of coupling components H-$A_1$-NH-$R_1$ and H-$A_2$-NH-$R_2$ with a diepoxide compound, for example, of the kind commercially available in epoxy resin chemistry. When a diglycidyl compound is used, a compound is obtained in which the symbols in the group -$R_3$-Z-$R_4$ have the following meanings: $R_3$ and $R_4$ are propylene groups which contain a hydroxyl group in β-position to the nitrogen atom directing coupling and Z is the residue of a diglycidyl compound free from glycidyl groups.

When the cycloaliphatic epoxy compounds described below in which the epoxy oxygen atoms are bound directly to a cycloaliphatic ring are used as starting materials, the alkylene residues $R_3$ and $R_4$ in the group —$R_3$-Z-$R_4$ are constituents of an alicyclic ring system and they also each contain a hydroxy group in β-position to the nitrogen atom directing coupling which is formed by the opening of the epoxide rings, which hydroxyl group can be subsequently acylated in a manner such that it bears the same acyl substituents as the alkyl groups $R_1$ and $R_2$ when they are acylated in β-position.

Accordingly, the preferred compounds of the invention are disazo dyestuffs of the formula (1) in which at least one, but preferably both, diazo component residues $D_1$ and $D_2$ can be quaternated, and the coupling component has the meaning given above, and in which the group -$R_3$-Z-$R_4$ has been produced by additively combining a diepoxide with two coupling components or azo dyestuff residues containing at least one active hydrogen atom bound to the nitrogen atom directing coupling.

The reaction of amino groups present in the aromatic nucleus is one of the fundamental reactions in epoxy resin chemistry, and all aspects of it have therefore been studied; for example, the work of Lee and Neville, "Epoxy Resins" New York, 1957, and Houben-Weyl, "Methoden der organischen Chemie," Vol. 14, Part 2, Stuttgart, 1963; pages 462-567. Reaction with other functional groups and the usual diepoxides used in epoxy resin technology has also been dealt with extensively.

Reaction between epoxy groups and amino groups can even take place at room temperature, although temperatures within the range of from 30° to 150°C would be employed in the case of amino groups in the aromatic nucleus.

The reaction proceeds in a manner such that the two epoxy groups of the formula

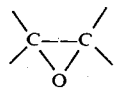

react with the free amino hydrogen atom of the group of the formula H-NR- to form the β-hydroxyamine of the formula

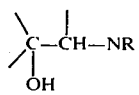

R being one of the residues $R_1$ or $R_2$. Disazo dyestuffs which are derived from an N,N-diglycidyl-alkylamine as middle component -$R_3$-Z-$R_4$-, for example, N,N-diglycidylpropylamine, may also be obtained in that an alkylamine is reacted with double the molar amount of a monoazo dyestuff of the general formula

D-N=N-A-N(R)-$CH_2$-CH(OH)-$CH_2$-Y or equivalent amounts of a dyestuff of the formula $D_1$-N=N-$A_1$-N($R_1$)-$CH_2$-CH(OH)-$CH_2$-NH-$R_5$ and a dyestuff of the formula $D_2$-N=N-$A_2$-N($R_2$)-$CH_2$-CH(OH)-$CH_2$-Y are reacted together, and, previously or subsequently, the fourth group $R_6$ is fused to the quaternatable nitrogen atom with an alkylating agent $R_6$-Y, the symbol Y representing an easily eliminable negative residue capable of being replaced in alkylating reactions, especially a chlorine, a bromine or an iodine atom.

When the starting materials used in the preparation of the dyestuffs of the formula (1) in accordance with the invention are monoazo dyestuffs of the formulae

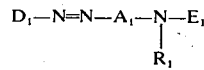

and

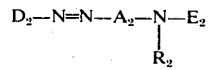

in which the groups $E_1$ and $E_2$ are groups containing reactive oxirane rings, it is preferable to start from the corresponding N-glycidyl compounds, or to use the corresponding N-γ-chloro- (or -bromo)-β-hydroxypropyl derivatives which are equivalent to the N-glycidyl compounds.

Monoazo dyestuffs of the kind mentioned are described in British Pat. Specifications Nos. 919,424, 856,898 and 868,468.

The following are given as examples of members of the well-known class of diepoxides or epoxy resins:-

Alicyclic polyepoxides in which at least one epoxy group is attached to the alicyclic ring, for example, vinylcyclohexene dioxide, limonene dioxide, dicyclopentadiene dioxide, bis-(2,3-epoxycyclopentylether, ethyleneglycol-bis-(3,4-epoxytetrahydrodicyclopentadien-8-yl)-ether, (3,4-epoxytetrahydrodicyclopentadien-8-yl)-glycidylether; compounds having two epoxycyclohexyl residues bound through ester or acetal linkages, for example, diethyleneglycol-bis-(3,4-epoxycyclohexanecarboxylate) bis-3,4-(epoxycyclohexylmethyl)-succinate, 3,4-epoxy-6-methylcyclohexylmethyl-3,4-epoxy-6-methylcyclohexanecarboxylate, as well as the acetal derived form 3,4-epoxyhexahydrobenzaldehyde and 3,4-epoxycyclohexane-1,1-dimethanol.

It is preferable to use bifunctional compounds having two terminal epoxy groups, for example, the diglycidylethers of dehydric alcohols, for example, glycoldiglycidylether, the diglycidylethers of dihydric phenols, for example, 4,4'-dihydroxy-diphenylmethane, -dimethylmethane or -sulphone, the diglycidylethers obtained from polyhydric thiols, for example, bis-(mercaptomethyl)-benzenes, the N,N'-diglycidyl compounds, for example, of N,N'-dimethyl-4,4'-diaminodiphenylmethane, ethyleneurea, 5,5-dimethylhydantoin, or oxamide, and the diglycidylesters of aliphatic, cycloaliphatic or aromatic dicarboxylic acids, for example, phthalic acid, hexahydrophthalic acid, tetrahydrophthalic acid or succinic acid, it being expedient to acylate after the reaction, especially after the reaction with a diglycidylester.

Thus, disazo dyestuffs of the invention are obtained in which the divalent bridging group Z is formed by the two-sided addition of an amino group directing coupling containing an active hydrogen atom to an epoxy compound, especially a diglycidyl compound, and the groups $R_3$ and $R_4$ represent N-β-hydroxyethylene groups formed by the opening of the oxirane rings, the hydroxyl groups formed by the opening of the oxirane rings advantageously being substituted, especially acylated.

Bifunctional coupling components suitable for the reaction with the diazonium compounds of the formula $D_1$-N=N-Cl and/or $D_2$-N=N-Cl are, for example, the following compounds, which, however, are preferably not coupled with heterocyclic and/or quaternatable diazo components:-

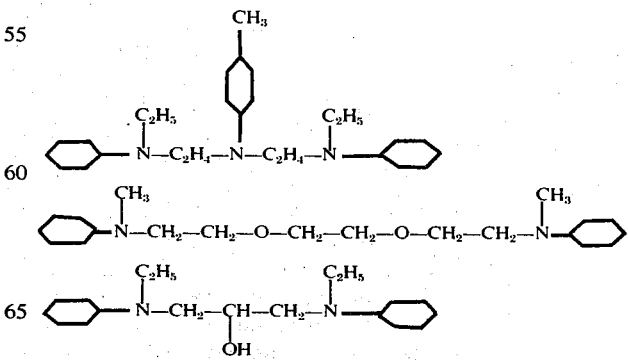

-continued

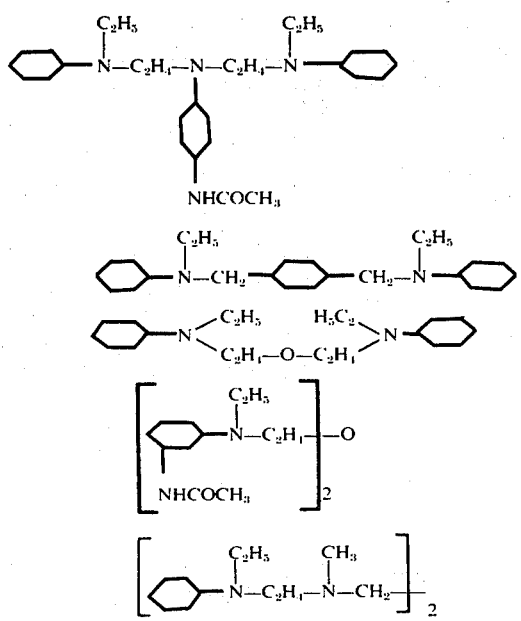

Bifunctional coupling components which are specially preferred which can also be coupled with heterocyclic and/or quaternatable diazo components are, for example, the following diamines which contain a secondary hydroxyl group which may be acylated in β-position to each of the nitrogen atoms directing coupling:-

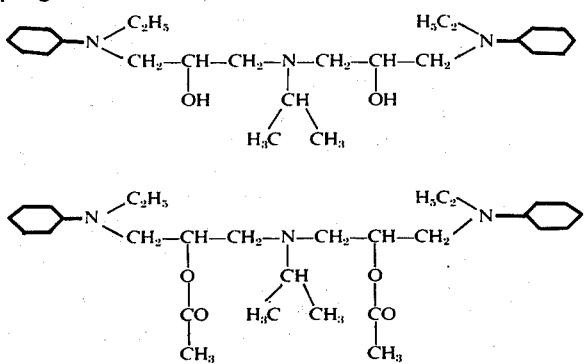

Further bifunctional coupling components which can be coupled with heterocyclic and/or quaternatable diazo components are those diamines which contain at least one acyl group in the bridging group, for example,

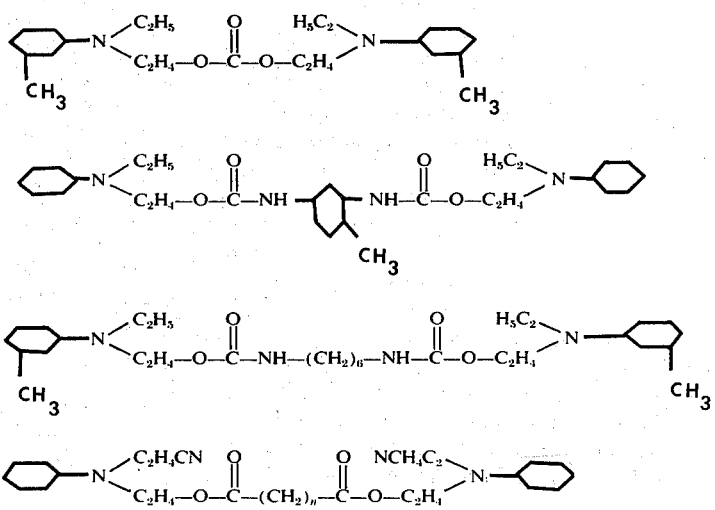

Coupling of the bifunctional coupling components may advantageously be effected in the presence of a coupling accelerator, for example, formamide, dimethylformamide and pyridine.

A preferred class of now disazo dyestuffs of the formula (1) is distinguished by the fact the diazo component residues of the formulae $D_1$ and $D_2$ are free from quaternatable nitrogen atoms and that preferably the bridging group without dyestuff characteristics of the formula Z does not contain an acyl group and/or contains at most one N,β-hydroxyethyl or -propyl group and/or does not represent a $-SO_2$ group.

Of these dyestuffs, special mention is made of those in which the diazo component residues $D_1$ and $D_2$ are derived from a negative substituted monoaminobenzene which is free from further unsubstituted or possibly substituted amino groups.

When the bifunctional coupling component of the formula

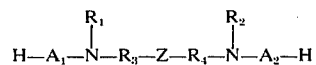

is coupled with less than 2 mols of a diazonium compound of the formula D-N=N-Cl, a mixture is formed which constitutes a mixture of the disazo dyestuffs of the invention and monoazo dyestuffs, which likewise como within the scope of the invention.

Quaternation of the new disazo dyestuffs of the formula (1) in accordance with the invention can be carried out when the divalent bridging group Z present in the said dyestuffs is free from ether bridges, especially phenolether bridges, and when preferably no C=N-C bonds interrupt the carbon chain of the bridging group Z, which group, however, should be interrupted by at least one hetero atom, preferably at least one acyl group. Generally, the finished disazo dyestuffs may be used, which, for this purpose, are treated with esters of strong mineral acids or organic sulphonic acids, for example, dimethyl sulphate; alkyl or aralkyl halides, for example, methyl bromide or benzyl chloride; methanesulphonic acid methylesters or esters of benzenesulphonic acids that may be substituted, for example, 4-methyl-, 4-chloro- or 4-nitrobenzene sulphonic acid ethyl ester. Alkylation is preferably effected by heating in an inert organic solvent, for example, xylene, carbon tetrachloride, ortho-dichlorobenzene or nitrobenzene.

However, other solvents may also be used, for example, acetic anhydride, dimethylformamide, acetonitrile or dimethylsulphoxide. The quaternated dyestuffs preferably contain as anion the residue of a strong acid, for example, sulphuric acid or a semi-ester thereof or a halogen ion, but they can also be used as double salts, for example, with zinc chloride, or as free bases.

Diamines of the formula $$H-A_1-NR_1-R_3-Z_2-R_4-NR_2-A_2-H$$

in which $R_1$ and $R_2$ each represents a hydrogen atom or preferably an alkylene group, $R_3$ and $R_4$ each represents an alkylene group, $Z_2$ represents a divalent residue which contains at least one, but preferably at least two, acyl groups or a diacyl residue as divalent groups in the main chain which joins the nitrogen atoms together, and $H-A_1$ and $A_2-H$ are phenylene or naphthalene residues, are also included in the invention.

These diamines may be obtained when the acylation processes described above are carried out with bifunctional compounds, but the dyestuff component is replaced by the corresponding coupling components of the formulae

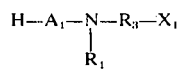

in which $H-A_1$, $H-A_2$, $R_1$, $R_2$, $R_3$ and $R_4$ have the meanings given above and $X_1$ and $X_2$ each represents a group containing at least one reactive hydrogen atom, preferably an amino, a mercapto or a hydroxyl group.

The dyestuffs described above, mixtures thereof, and mixtures of these dyestuffs and other azo dyestuffs, especially when converted into a finely divided form, for example, by grinding, pasting, reprecipitation and so forth, are eminently suitable for dyeing and printing synthetic fibres, for example, acrylic fibres and acrylonitrile fibres, fibres made from polyacrylonitrile and copolymers of acrylonitrile and other vinyl compounds, for example, acylic esters, acrylamides, vinylpyridine, vinyl chloride or vinylidene chloride, copolymers of dicyanoethylene and vinyl acetate, as well as acrylonitrileblock polymers, fibres made from polyurethanes, cellulose triacetate and cellulose (2½) acetate, polyamides, for example, nylon 6, nylon 6.6 or nylon 12, and especially fibres made from aromatic polyesters, for example, those made from terephthalic acid and ethylene glycol or 1,4-dimethylolcyclohexane, and copolymers of terephthalic and isophthalic acid and ethylene glycol.

The present invention therefore also includes a process for dyeing or printing synthetic fibres, especially polyester fibres, wherein there are used water-insoluble disazo dyestuffs which are free from carboxyl and sulphonic acid groups and which correspond to the formula

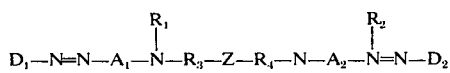

in which $R_1$ and $R_2$ each represents a hydrogen atom or a substituted alkyl group, each of which may be bound to residues $A_1$ and $A_2$ respectively in ortho-position to the nitrogen atoms directing coupling to form a ring, $R_3$ and $R_4$ each represents an alkylene group which binds the nitrogen atom to Z preferably through at least 2 carbon atoms, the groups $-NR_1-R_3-Z-R_4-NR_2-,-NR_1-R_3-Z$ or $-NR_1-R_4-Z-$ being capable of forming a perhydropyrazine residue, $A_1$ and $A_2$ each represents a paraphenylene residue, $D_1$ and $D_2$ each represents the residue of a diazo component free from quaternated atoms and Z represents a divalent bridging group preferably containing at least one hetero atom and which does not have dyestuff characteristics, mixtures of such dyestuffs and mixtures of the said dyestuffs and other azo dyestuffs.

Preferably, the nitrogen atoms directing coupling are joined together through at least five atoms.

One case in which the nitrogen atoms directing coupling present in the dyestuffs used are joined together by fewer than five atoms is that of the dyestuffs of the formula

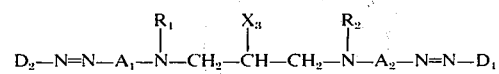

in which $X_3$ represents a hydroxyl group or a bromine or a chlorine atom and $R_1$, $R_2$, $A_1$, $A_2$, $D_1$ and $D_2$ have the meanings given above.

The dyeing process is preferably carried out with those dyestuffs in which the colourless bridging group Z does not contain an acyl group and in which the residues $R_3$ and $R_4$ contain at most one β-hydroxyethyl or -propyl group.

When the above-mentioned new dyestuffs of the formula (1) contain one or two quaternated diazo residues of the formula $D_1$ and/or $D_2$, they are eminently suitable for dyeing fibres and fabrics of the polyacrylic type. In this field of application preference is given to these dyestuffs in which the residue Z contains at least one acyl residue and/or the residues $R_3$ and $R_4$ are N-β-hydroxyethyl- or -propyl groups that may be acylated.

Dyestuffs that are specially suitable for dyeing acrylic fibres, that is to say, fibres synthesized at least in part from acrylonitrile or dicyanoethylene, are the water-insoluble dyestuffs free from quaternary groups and in which the bridging group Z contains one or more amino groups which are not bound aromatically, that is to say, which are not bound to an aromatic ring and which are not present in such a ring.

For dyeing, the water-insoluble, non-quaternated dyestuffs are advantageously used in a finely divided form and in the presence of a dispersing agent, for example, sulphite cellulose waste liquor or a synthetic detergent, or a combination of different wetting and dispersing agents. Prior to dyeing it is generally advantageous to convert the dyestuff into a dyeing preparation which contains a dispersing agent and the finely divided dyestuff in a form such that a fine dispersion is formed when the preparation is diluted with water. Such dyestuff preparations may be obtained in known manner, for example, by grinding the dyestuff in the dry or wet state in the presence or absence of a dispersing agent.

To obtain stronger dyeings, for example, on polyethylene terephthalate fibres, it is advantageous to add a swelling agent to the dyebath, or to carry out the dyeing process under superatmospheric pressure at a temperature of above 100°C, for example, at 120°C. Suitable swelling agents are aromatic carboxylic acids, for example, benzoic acid or salicylic acid, phenols, for example, ortho- or para-hydroxydiphenyl, aromatic halogenated compounds, for example, chlorobenzene, orthodichlorobenzene or trichlorobenzene, phenylmethylcarbinol or diphenyl. When carrying out the dyeing process under superatmospheric pressure, it is generally advantageous to render the dyebath slightly acid, for example, by the addition of a weak acid, for example, acetic acid.

The non-quaternated, water-insoluble dyestuffs to be used in accordance with the invention are specially suitable for application by the so-called thermofixation process in which the fabric to by dyed is impregnated preferably at a temperature not exceeding 60°C with an aqueous dispersion of the dyestuff which advantageously contains 1 to 50 percent of urea and a thickening agent, especially sodium alginate, and squeezed in the usual manner. The fabric is advantageously squeezed so as to retain 50 to 100 percent of its dry weight of dyeliquor.

To fix the dyestuff, the fabric so impregnated is heated to a temperature of above 100°C, for example, to a temperature between 180° and 210°C, preferably after drying, for example, in a current of warm air.

The above-mentioned thermofixation process is specially suitable for dyeing union fabrics made from polyester fibres and cellulosic fibres especially cotton. In this case, the padding liquor contain, in addition to the non-quaternated, water-insoluble dyestuff to be used in accordance with the invention, dyestuffs which are suitable for dyeing cotton, for example, direct dyestuffs or vat dyestuffs, or especially the so-called reactive dyestuffs, that is to say, dyestuffs that can be fixed on the cellulosic fibre with formation of a chemical bond, for example, dyestuffs which contain a chlorotriazine or a chlorodiazine residue. In the latter case it is advantageous to add an agent capable of binding acid to the padding solution, for example, an alkali metal carbonate or an alkali metal phosphate or an alkali metal borate or perborate, or a mixture thereof. When using vat dyestuffs, the padded fabric has to be treated after the heat treatment with an aqueous alkaline solution of one of the reducing agents commonly used in vat dyeing.

The dyeings produced on polyester fibres by the said process are advantageously subjected to an after-treatment, for example, by heating with an aqueous solution of a non-ionic detergent.

The dyestuffs may also be applied by printing processes. In this method of application a printing paste, for example, is used which contains the finely divided dyestuff, if necessary, in admixture with one of the above-mentioned cotton dyestuffs, as well as the adjuvants normally used in printing, for example, wetting and thickening agents, if necessary, in the presence of urea and/or an agent capable of binding acid.

The processes indicated produce strong dyeings and prints possessing excellent properties of fastness, especially good fastness to light, sublimation, decatizing, washing and chlorinated water. Dyeings on acetate rayon are also distinguished by good fastness to gas fading. A further advantage of the dyestuffs to be used in accordance with the invention is that they reserve well on wool and cotton.

Dyeing acrylic fibres, that is to say, fibres synthesized at least in part from acrylonitrile or dicyanoethylene, is specially advantageously effected with those water-insoluble members of the above group of dyestuffs in which the group Z contains one or more amino groups that are not bound aromatically, that is to say, that are not bound to an aromatic ring or are not present in a ring when the said ring greatly reduces the basicity of the nitrogen atom.

The new water-insoluble non-quaternated dyestuffs may also be used for the spin-colouration of polyamides, polyesters and polyolefines. The polymer to be coloured is advantageously admixed with the dyestuff in the form of a powder, grains or chips, as a solution ready for spinning or in the form of a melt; the dyestuff may be in the dry state, or in the form of a dispersion or a solution in a solvent which may be volatile. After the dyestuff has been homogeneously dispersed in the polymer solution or melt, the mixture is processed in known manner into fibres, yarns, monofilaments, films and so forth in known manner, for example, by casting, moulding or extruding.

The new quaternated dyestuffs or dyestuff salts are suitable for dyeing and printing a very wide variety of synthetic fibres, for example, polyvinyl chloride, polyamide and polyurethane fibres, and also polyester fibres, for example, polyethylene terephthalate fibres, but especially polyacrylonitrile fibres or polyvinylidene cyanide fibres and copolymers thereof with other monomers.

The new dyestuffs are also suitable for colouring polymerization products of acrylonitrile, polyolefines and other plastics by addition to the composition prior to the shaping operation, and they may also be used for colouring oil paints and lacquers. The above-mentioned thermofixation process may also be applied.

Some of the new products are also valuable pigments which may be used for a very wide variety of purposes. For example, they may be used in a state of fine division for the spincolouration of filament and staple-fibre viscose and cellulose ethers and esters, and also in the production of coloured lacquers and lake-formers, solutions or products made from cellulose acetate, nitrocellulose, natural or synthetic resins, for example, polymerization resins or condensation resins, for example, aminoplasts, alkyd resins, phenoplasts and polyolefines, for example, polystyrene, polyvinyl chloride, polyethylene, polypropylene, polyacrylonitrile, rubber, casein, silicones and silicone resins.

The following Examples illustrate the invention. Unless otherwise stated, the parts and percentages are by weight.

Preparation of the bifunctional coupling components
Procedure I 48.8 Parts of N-ethyl-N-($\beta$-hydroxyethyl)-meta-toluidine in 30 parts by volume of anhydrous nitrobenzene are stirred together with 11 parts of metallic sodium for 15 hours while heating under reflux. The excess of sodium is removed and then 53.8 parts of N-ethyl-N-($\beta$-chloroethyl)-meta-toluidine in 50 parts by volume of anhydrous benzene and 4 parts of sodium iodide are added. The mixture is stirred for a prolonged period under reflux and is then diluted with anhydrous benzene. The sodium chloride and sodium iodide formed are removed by filtration and the filtrate is concentrated and distilled. It boils within the range of from 185° to 195°C under a pressure of 0.1 mm Hg. The amine so obtained corresponds to the formula

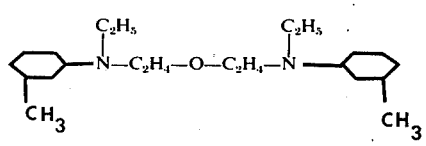

Analysis: Calculated: C 77.6% H 9.5% N 8.2%
Found: C 77.9% H 9.7% N 8.3%.

By replacing the toluidine derivative with the corresponding aniline derivative, the amine of the formula

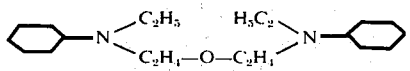

is obtained in the form of a yellow, viscous oil boiling at 150 to 170°C/0.01 mm Hg.

Procedure II

36 Parts of N-ethyl-N-(β-hydroxyethyl)-meta-toluidine, together with 12.5 parts of carbonic acid diethyl ester and 0.2 part of sodium, are slowly heated to 170°C in an oil bath while stirring, in which process ethanol is distilled. After some time, the batch is allowed to cool, the residue is dissolved in benzene and extracted with water. The benzene phase is dried, the benzene is evaporated and the crude product is distilled. 18.2 Parts of a pale yellow oil boiling at 195 to 105°C/0.02 mm Hg and corresponding to the formula

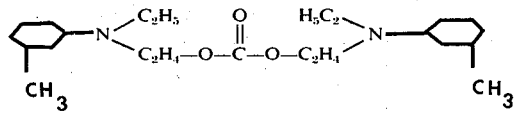

are obtained.

Analysis:  Calculated:  C 71.8%  H 8.4%  N 7.3%
           Found:       C 72.3%  H 8.4%  N 7.2%.

Procedure III

50 Parts of N-ethyl-N-(β-hydroxyethyl)-aniline and 26 parts of toluylene-2,4-diisocyanate are heated in a bath at 90° to 95°C in 50 parts of anhydrous benzene. On cooling, 73.3 parts of the crude product precipitate in the form of colourless crystals molting at 108° to 115°C. After one recrystallization from methanol, the melting point is 113 to 116°C.

The product corresponds to the formula

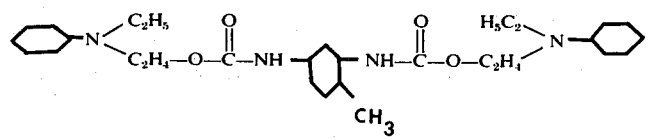

Analysis:  Calculated:  C 69.0%  H 7.2%  N 11.1%
           Found:       C 69.1%  H 6.9%  N 11.5%.

Procedure IV

By using 54 parts of N-ethyl-N-(β-hydroxyethyl)-metatoluidine, 25 parts of hexamethylene-1,6-diisocyanate and 50 parts of benzene and following the procedure described in Procedure II, there are obtained, after the addition of 80 parts of ethyl alcohol and cooling, 46 parts of a crude product melting at 58° to 60°C. After one recrystallization from methanol, the melting point is 60° to 62°C. The product corresponds to the formula

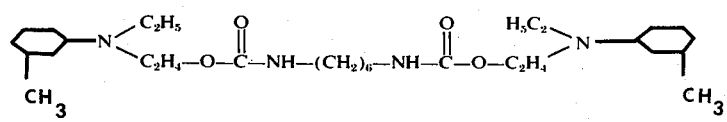

Analysis:  Calculated:  C 68.4%  H 8.8%  N 10.6%
           Found:       C 68.4%  H 8.6%  N 10.5%.

Procedure V

19 Parts of N-β-hydroxyethyl-N-β-cyanoethylaniline in 100 parts of chlorobenzene are added dropwise to 100 parts of chlorobenzene saturated with phosgene at a temperature of 0°C. The batch is stirred for 3 hours at that temperature while continuously introducing phosgene. The batch is then heated to about 50° to 55°C, stirred for about 30 minutes at that temperature and then heated to 80° to 85°C. Phosgene is introduced at that temperature, while stirring, until a clear solution forms. The excess of phosgene is then blown out with nitrogen and the hot solution is filtered. This solution is added to 19 parts of N-β-hydroxyethyl-N-β-cyanoethylaniline and the whole is heated for 24 hours under reflux while stirring. The solvent is then completely removed in vacuo, and 10 ml of ethanol are added to the residue. After two to three days, most of the residue has solidified. After filtration, the residue is triturated with cold ethanol and isolated by filtration. After recrystallization, a product of the formula

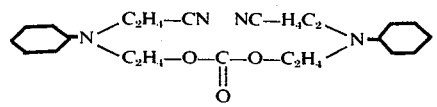

is obtained.

Analysis:  Calculated:  C 67.96%  H 6.45%  N 13.79%
           Found:       C 68.21%  H 6.37%  N 13.56%.

Procedure VI

30 Parts of N-ethylaniline, 17.1 parts of β,γ,β',γ'-diepoxy-tripropylamine (prepared in accordance with French Pat. Spec. No. 1,137,175), 30 parts by volume of chlorobenzene and 10 drops of triethylamine are stirred for 30 hours at 140° to 150°C. The solvent is then removed in vacuo and the residue is distilled in a high vacuum. The β,β'-dihydroxy-γ,γ'-di-(N-phenyl-N-ethylamino)-tripropylamino of the formula

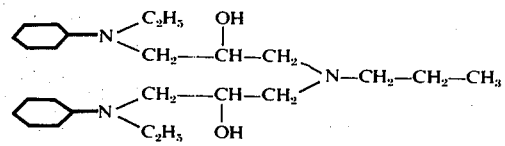

is obtained in the form of a viscous oil.

Analysis:  Calculated:  C 72.60%  H 9.51%  N 10.16%
           Found:       C 72.3%  H 9.7%  N 10.2%.

30 Parts of β,β'-dihydroxy-γ,γ'-di-(N-phenyl-N-ethylamino)-tripropylamine are heated together with 100 parts by volume of acetic anhydride for 3 hours under reflux. The solvent is then removed in vacuo and the residue is distilled in a high vacuum. The β,β'-diacetoxy-γ,γ'-di(N-phenyl-N-ethylamino)tripropylamine of the formula

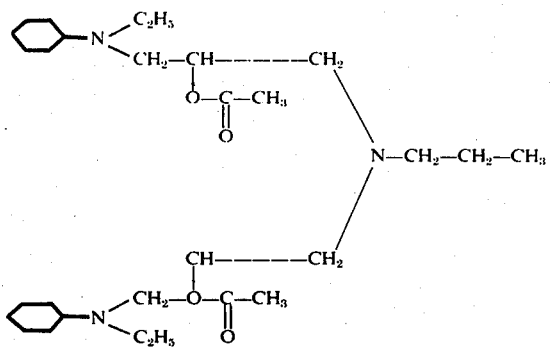

is obtained in the form of an oil.

| Analysis: | Calculated: | C 69.99% | H 8.17% | N 8.44% |
|---|---|---|---|---|
| | Found: | C 69.6% | H 8.8% | N 8.6%. |

Procedure VII

30 Parts of N-ethylaniline, 15 parts of butanedioldiglycidylether and 50 ml of chlorobenzene are stirred for 30 hours at 140 to 150°C. The solvent is then removed in vacuo and the residue is distilled in a high vacuum. An oily product of the formula

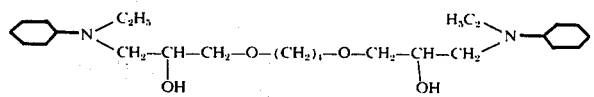

is obtained.

| Analysis: | Calculated: | C 70.25% | H 9.07% | N 6.30% |
|---|---|---|---|---|
| | Found: | C 70.0% | H 8.9% | N 6.3%. |

The product is subsequently acetylated with an excess of acetic anhydride and the reaction mixture on evaporation in vacuo yields the product of the formula

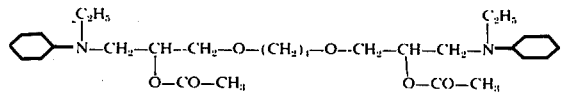

The following bifunctional coupling components are prepared in an analogous manner. After acetylation, the acetylation products are used for the manufacture of disazo dyestuffs without further purification. This mode of working has the advantage that any excess of monoalkylaniline that may be present is converted into the corresponding N-acyl derivative which has a much lower coupling capacity than the bifunctional coupling components and virtual does not participate in coupling under the coupling conditions subsequently described.

All the following products were obtained in the form of viscous oils,

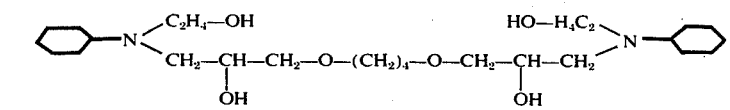

IX 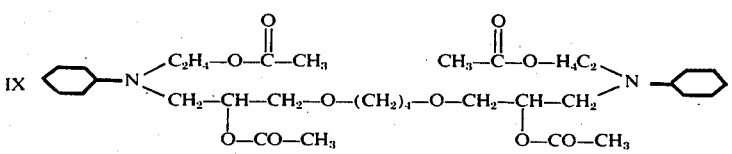

X 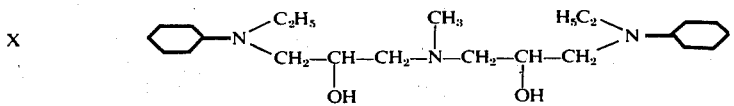

XI 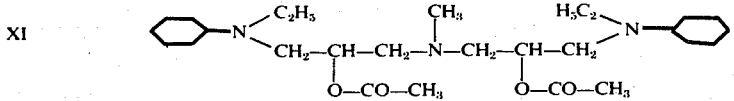

XII 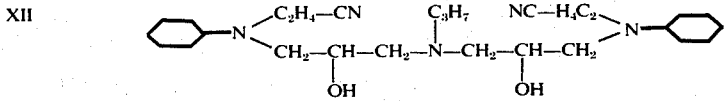

XIII 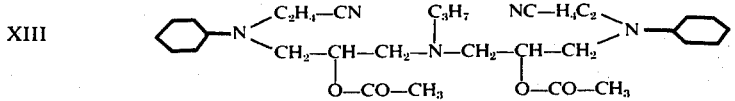

XIV 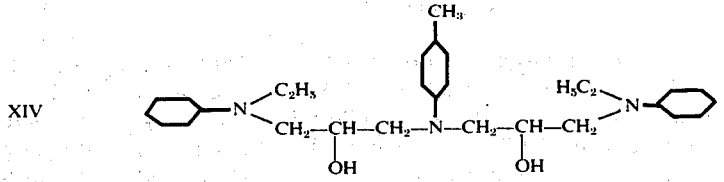

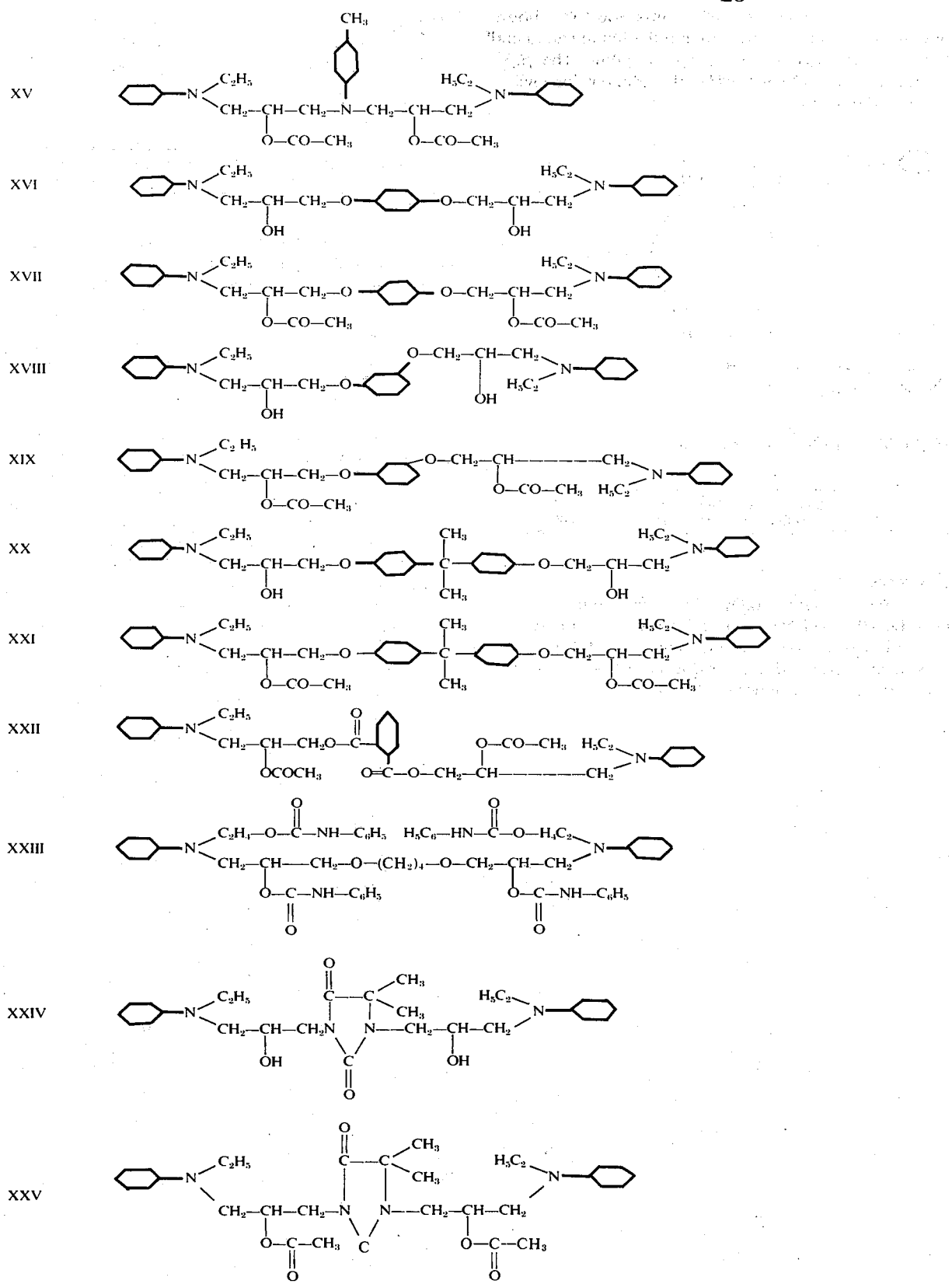

EXAMPLE 1

3.4 Parts of 2-cyano-4-nitroaniline are added in portions to 30 parts of sulphuric acid monohydrate in which 1.4 parts of sodium nitrite have been dissolved. After some time, this diazo compound is discharged on to 150 parts of ice, the excess of nitrite is destroyed and a solution of 3.6 parts of carbonic acid-di-β-(phenylethylamino)-ethyl ester in 75 parts of glacial acetic acid is added. After some time, the dyestuff is precipitated by buffering with 30 percent soddium hydroxide solution and cooling to a temperature not higher than 10°C. It ayes polyester fibres claret shades possessing excellent fastness to light and sublimation.

The same dyestuff may be obtained by reacting 2 mols of N-[4-(2'-cyano-4'-nitrophenylazo)-phenyl]-N-ethylaminoethanol with 1 mol of phosgene.

EXAMPLE 2

By following the procedure described in Example 1 and replacing the 3.6 parts of carbonic acid-di-β-(phenylethylamino)ethyl ester with 4.1 parts of carbonic acid-di-[β-phenyl-β'-cyanoethylamino]-ethyl ester, a dyestuff is obtained which dyes polyester red shades possessing excellent properties of fastness.

EXAMPLE 3

By following the procedure described in Example 1 and replacing the 3.6 parts of carbonic acid-di-β-(phenylethylamino)ethyl ester with 4.6 parts of succinic acid-di-[β-phenyl-β'-cyanoethylamino]-ethyl ester, a dyestuff is obtained which dyes red shades possessing excellent properties of fastness.

EXAMPLE 4

24.9 Parts of N-ethyl-N-2'-methylaminoethyl-aniline (prepared from the para-toluenesulphonic ester of N-ethyl-N-2'-hydroxyethylaniline and methylamine) are dissolved in 50 parts by volume of pyridine; 12.8 parts of adipic acid dichloride are added dropwise at 10° to 20°C, the batch is heated to 80°C within one hour while stirring, stirred for 2 hours at 80°C, discharged on to ice while still warm, neutralized with a 10% sodium carbonate solution, taken up in benzene, the organic phase is washed with a sodium chloride solution, dried with calcium chloride, filtered and concentrated. 19.3 Parts of the product of the formula

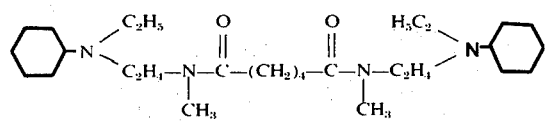

remain in the form of a brown oil.

1.64 Parts of 2-cyano-4-nitroaniline are diazotized in the usual manner at 15° to 25°C with N nitrosylsulphuric acid, the diazo compound is discharged on to ice and then treated with a small amount of sulphamic acid. A solution of 2.3 parts of the product described in the preceding paragraph in 20 parts by volume of glacial acetic acid is added to this mixture of 0° to 5°C while stirring, the batch is stirred overnight at 0° to 5°C, the crystal slurry is isolated by suction filtration, washed with water until the washings run neutral and then dried in a vacuum cabinet at 40°C. 3.3 Parts of the dyestuff of the formula

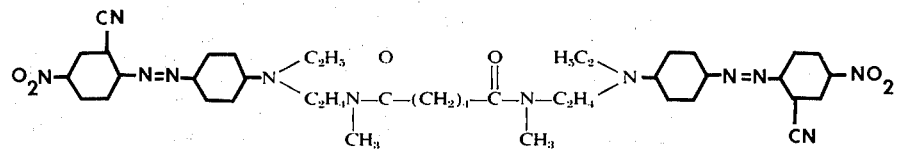

remain. It dyes polyester material bluish red shades possessing good properties of fastness.

EXAMPLE 5

50.9 Parts of N-β-cyanoethyl-N-β-hydroxyethylaniline are dissolved in 70 parts by volume of anhydrous benzene. 25 Parts of α-chlorofumaric acid dichloride are added dropwise to this solution, the batch is stirred under reflux for 4 hours, discharged on to a mixture of ice and water, neutralized with sodium carbonate, the benzene phase is separated, dried with calcium chloride, filtered, and the filtrate is concentrated. 58.5 Parts of the product of the formula

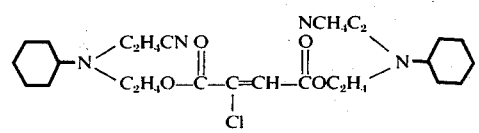

are obtained in the form of a dark oil. No starting material is detectable in a thin-layer chromatogram.

9.65 Parts of 2,6-dichloro-4-nitroaniline (94.6 percent) are diazotized at a temperature not exceeding 35°C in 44 parts by volume of N nitrosyl-sulphuric acid, and the batch is discharged on to a mixture of ice and water. 9.9 Parts of the product described above are dissolved in 200 parts by volume of acetone and then 40 parts by volume of water are added. The diazo component is added dropwise at −5° to 0°C to this solution, the batch is stirred overnight at 0°C, the product is isolated by suction filtration, washed until the washings run neutral and dried. 17.7 Parts of the dyestuff of the formula

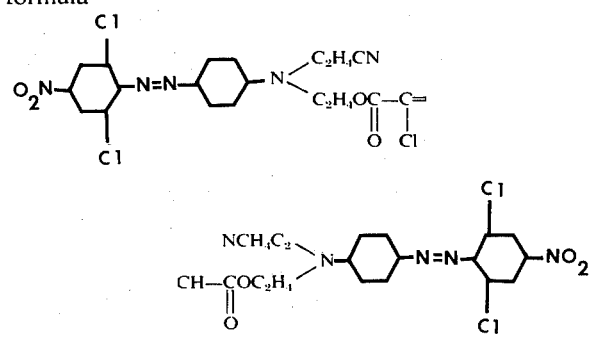

are obtained which dyes polyester materials yellow-brown shades possessing excellent properties of fastness.

EXAMPLE 6

71.2 Parts of N-ethyl-N-3'-aminopropylaniline (obtained by pressure-hydrogenation of N-ethyl-N-β-cyanoethylaniline in liquid ammonia) and 43.6 parts of pyromellitic anhydride are melted together for some hours at 180°C. After cooling, the brown-red oil obtained is dissolved in 1,000 parts by volume of hot chloroform, the solution is cooled, the reddish crystalline mass is isolated by filtration, washed with chloroform and then dried in a vacuum cabinet. 60 parts of the product of the formula

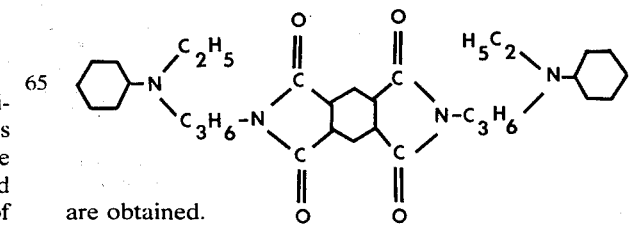

are obtained.

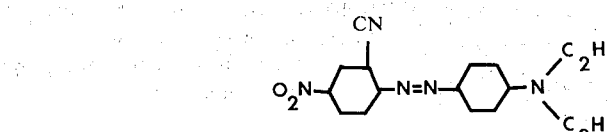
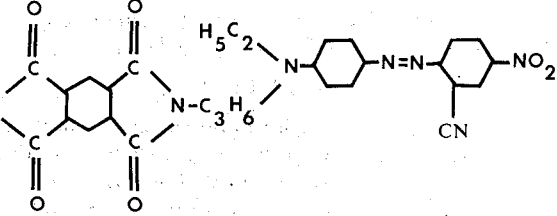

| Analysis: | N calculated | 10.4% |
|---|---|---|
| | N found | 10.2%. |

1.63 Parts of 2-cyano-4-nitroaniline are diazotized in the usual manner in 10 parts by volume of N nitrosyl-sulphuric acid and the batch is discharged on to a mixture of ice and water. A solution of 2.7 parts of the product described above in 50 parts by volume of 2N sulphuric acid is added to this mixture, and the batch is stirred for a number of hours at 0° to 5°C. The dark, crystalline disazo dyestuff of the formula is isolated by suction filtration, washed with water until the washings run neutral, washed with a small amount of alcohol and dried. It dyes polyester material violet shades possessing very good properties of fastness.

By reacting the components listed in Columns II and III in the following Table, a coupling component is obtained which, when coupled with double the molar amount of a diazo compound of the component shown in Column I, produces a dyestuff which yields on polyester the shade given in Column IV.

| | I | II | III | IV |
|---|---|---|---|---|
| 7 | 2-cyano-4,6-dinitro-aniline | N-β-hydroxyethyl-N-β-cyanoethylaniline | phosgene | violet |
| 8 | 4-nitroaniline | " | " | orange |
| 9 | 2-cyano-4-nitroaniline | " | terephthaloyl-dichloride | red |
| 10 | " | " | 1,6-hexamethy-lene-diiso-cyanate | red |
| 11 | " | " | adipic acid dichloride | red |
| 12 | 2-chloro-4-nitro-aniline | " | phosgene | orange |
| 13 | 2,6-dichloro-4-nitro-aniline | N-ethyl-N-β-hydroxy-ethylaniline | phosgene | brown |
| 14 | " | N-β-hydroxyethyl-N-β-cyanoethylaniline | " | yellow-brown |
| 15 | 2-cyano-4-nitro-aniline | N-β-hydroxyethyl-N-β-cyanoethylaniline | toluylene-2,4-diisocyanate | red |
| 16 | " | " | thiophene-2,5-dicarboxylic acid dichloride | red |
| 17 | " | N-ethyl-N-β-hydroxy-ethylaniline | toluylene-2,4-diiso-cyanate | violet |
| 18 | " | N-ethyl-N-β-hydroxy-ethyl-3-methylaniline | hexamethylene-1,6-diiso-cyanate | violet |
| 19 | " | N-ethyl-N-β-hydroxy-ethylaniline | phosgene | claret |
| 20 | 2-cyano-4-nitro-6-chloroaniline | N-ethyl-N-β-hydroxy-ethyl-3-methylaniline | N-β-chloro-ethyl-N-ethyl-3-methyl-aniline | blue-violet |
| 21 | 2-cyano-4-nitro-aniline | N-ethyl-N-β-hydroxy-ethyl-3-methylaniline | N-β-chloroethyl-3-methyl-aniline | violet |
| 22 | " | N-ethyl- and N-β-cyanoethyl-N-β-hydroxyethylaniline | phosgene (with N-β-cyanoethyl-N-β-hydroxy-ethylaniline-chloroformic acid ester as intermediate product) | red |
| 23 | 2-benzoyl-4,6-dinitroaniline | N-β-cyanoethyl-N-β-hydroxyethylaniline | succinic acid dichloride | red |
| 24 | 4-nitroaniline | N-β-ethyl-N-β-hydroxy-ethyl-3-methylaniline | terephthalic acid dichloride | red |
| 25 | 2,6-dichloro-4-nitroaniline | " | " | claret |
| 26 | 2-chloro-4-nitro-aniline | " | " | claret |
| 27 | 4-nitroaniline | " | 2,6-pyridine-dicarboxylic acid dichloride | red |
| 28 | 2-cyano-4-nitro-aniline | N-β-ethyl-N-β-hydroxy-ethyl-3-methylaniline | 2,6-pyridine-dicarboxylic acid dichloride | violet |
| 29 | 2,6-dichloro-4-nitroaniline | " | " | brown |

-continued

| | I | II | III | IV |
|---|---|---|---|---|
| 30 | 4-nitroaniline | " | isophthalic acid dichloride | brown-orange |
| 31 | 2-chloro-4-nitroaniline | " | " | claret |
| 32 | 2,6-dichloro-4-nitroaniline | " | phthalic acid dichloride | brown |
| 33 | 4-nitroaniline | " | $(Cl-CO-CH_2CH_2)_2S$ | orange |
| 34 | 2-cyano-4-nitroaniline | " | $(Cl-CO-CH_2CH_2)_2S$ | violet |
| 35 | 2,6-dichloro-4-nitroaniline | " | " | brown |
| 36 | 2-cyano-4-nitroaniline | N-$\beta$-cyanoethyl-N-$\beta$-hydroxyethylaniline | fumaric acid dichloride | red |
| 37 | 2,6-dichloro-4-nitroaniline | N-$\beta$-cyanoethyl-N-$\beta$-hydroxyethylaniline | " | yellow-brown |
| 38 | 4-nitroaniline | N-$\gamma$-aminopropyl-N-ethylaniline | " | scarlet |
| 39 | 2-cyano-4-nitroaniline | N-$\beta$-cyanoethyl-N-$\beta$-hydroxyethylaniline | 2-chloroformic acid dichloride | red |
| 40 | 4-nitroaniline | " | fumaric acid dichloride | orange |
| 41 | 2-cyano-4-nitroaniline | N-benzyl-N-$\beta$-hydroxyethylaniline | N-benzyl-N-$\beta$-chloroethylaniline | ruby |
| 42 | 2-chloro-4-nitroaniline | " | " | scarlet |
| 43 | 2-chloro-4-methylsulphonylaniline | " | " | reddish yellow |
| 44 | 2-cyano-4-nitroaniline | N-ethyl-N-$\beta$-hydroxyethylaniline | isophthalic acid dichloride | violet |
| 45 | " | " | thiophene-2,5-dicarboxylic acid dichloride | violet |

EXAMPLE 46

4.4 Parts of 2,6-dichloro-4-nitroaniline are introduced at 25° to 30°C into 20 parts by volume of N nitrosylsulphuric acid, the batch is stirred for one hour, discharged on to ice and sulphamic acid is added. A solution of parts of the carbonic acid ester of N-$\beta$-hydroxyethyl-N-$\beta$-methyl-aniline in 20 parts by volume of glacial acetic acid is added to this mixture of 0°C, whereupon the dyestuff of the formula

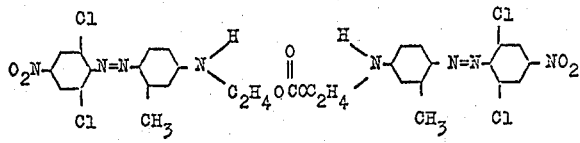

precipitates. The batch is stirred for 4 hours at 0°C, andd the dyestuff is then isolated by suction filtration, washed with cold water until the washings run neutral and then dried. It dyes polyester material brown shades possessing good properties of fastness.

EXAMPLE 47

3.3 Parts of 2-cyano-4-nitroaniline are diazotized at 20°C in 20 parts by volume of N nitrosylsulphuric acid, and the batch is discharged on to 200 parts of ice. A solution of 4.97 parts of $\beta,\beta'$-diacetoxy-$\gamma,\gamma'$-di(N-phenyl-N-ethyl(aminotripropylpropane in 50 parts by volume of dimethylformamide is added dropwise to this solution at a temperature not exceeding 10°C, the batch is stirred for 3 hours, neutralized with 30 percent sodium hydroxide solution and then stirred overnight. The dyestuff is then isolated by filtration and dried in vacuo. The dyestuff so obtained corresponds to the formula

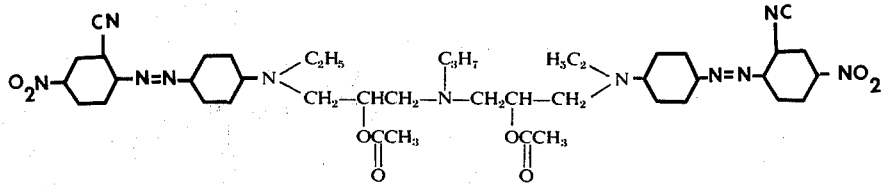

and dyes prolyester fibres ruby shades. It also produces ruby shades of good fastness to light on polyacrylonitrile.

By coupling a diazo compound of the components listed in Column I of the following Table with the coupling components listed in Column II, dyestuffs are obtained which dye polyester the shades listed in Column III and polyacrylonitrile the shades listed in Column IV.

| I | II | | III | IV |
|---|---|---|---|---|
| 48 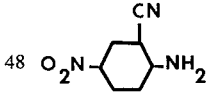 | 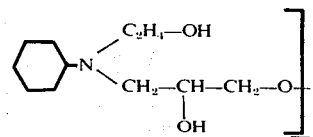 | —(CH$_2$)$_4$— | ruby | — |
| 49 " | 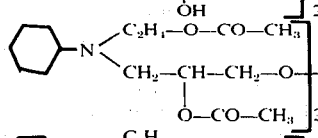 | —(CH$_2$)$_4$— | red | — |
| 50 " | 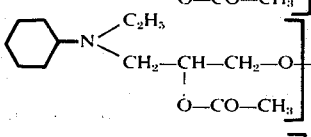 | —(CH$_2$)$_4$— | violet | — |
| 51 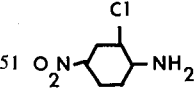 | 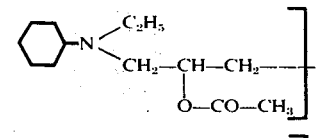 |  | red | red |
| 52 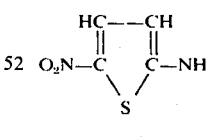 | 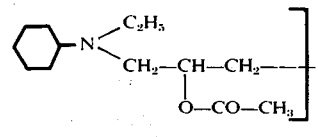 |  | violet3 | bluish violet |
| 53 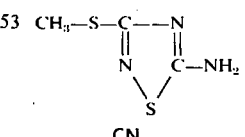 | " | | red | red |
| 54 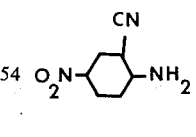 | 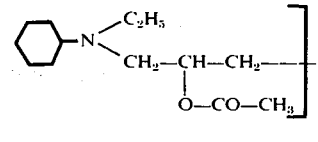 |  | ruby | ruby |
| 55 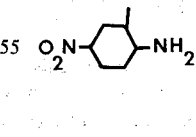 | 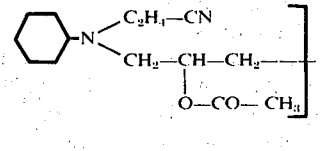 |  | red | red |
| 56 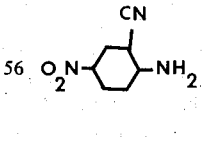 | 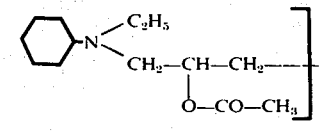 |  | ruby | — |
| 57 " | 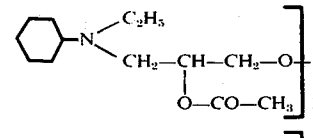 |  | violet | — |
| 58 " | 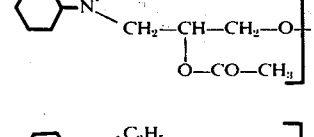 |  | violet | — |
| 59 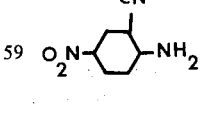 | 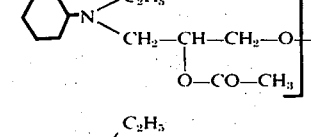 | 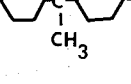 | violet | — |
| 60 " | 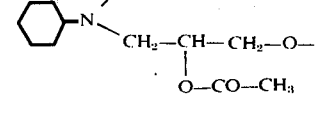 |  | violet | — |

| I | II | III | IV |
|---|---|---|---|
| 61 | " | | violet | — |

(Row 61 structure shown in image)

EXAMPLE 62

3.45 Parts of 2-chloro-4-nitroaniline are suspended in 40 parts by volume of water and 6 parts by volume of concentrated hydrochloric acid, the suspension is cooled to 0°C and diazotization is effected with 6 parts by volume of 4N sodium nitrite solution. The excess of nitrite is then destroyed with sulphamic acid and the solution is added dropwise at a temperature not exceeding 10°C to a solution of 3.25 parts of N,N-di-[β-(N'-phenyl-N'-ethylamino)-ethyl]methylamine in 150 parts by volume of dimethylformamide. After some time, the pH is adjusted to 6 to 7 by the addition of sodium hydroxide solution and the dyestuff solution is stirred for a short period. The dyestuff is then precipitated by the addition of a mixture of ice and water. The dyestuff is separated from the aqueous solution by centrifuging and dried in vacuo. A product of the formula

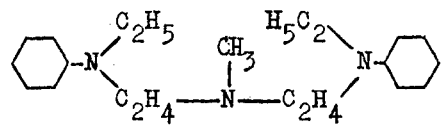

is obtained in the form of a practically colourless oil boiling at 155°C/0.04 mm Hg.

EXAMPLE 63

4.57 Parts of para-amino-CO-)N-chlorotrimethylamino)acetophenone dissolved in hydrochloric acid are diazotized at 0° to 5°C with 10 ml of 2N NaNO₂ solution, and then a solution of 4.97 parts of β,β'-diacetoxy-γ,γ'-di-(N-phenyl-N-ethyl)-aminotripropylamine in 50 ml of dimethylformamide is added dropwise at a temperature not exceeding 10°C. The batch is stirred for 3 hours, neutralized, and then

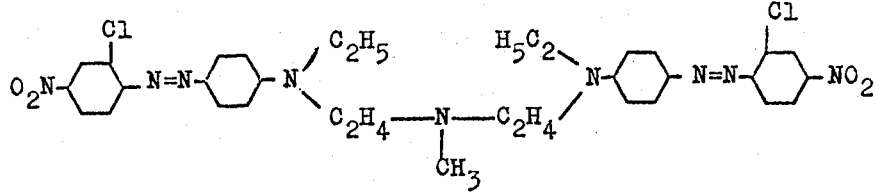

is obtained which dyes polyester and polyacrylonitrile red shades.

Preparation of the bifunctional component

256 Parts of the toluenesulphonic ester of N-ethyl-N-β-hydroxyethyl-aniline, 290 parts of ethanol and 80 stirred overnight. The dyestuff is then salted out with sodium chloride and dried. A dyestuff is obtained which dyes polyacrylonitrile a brown shade possessing good properties of fastness; it corresponds to the formula

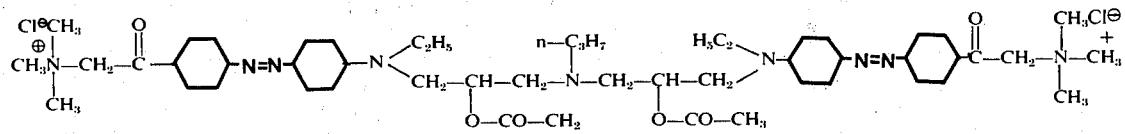

parts of 35 percent aqueous methylamine solution are stirred for 2 hours under reflux at 80°C. The reaction mixture is evaporated under reduced pressure, the residue is suspended in water, the suspension is made strongly alkaline with 100 parts of concentrated sodium hydroxide solution and then extracted with chloroform. After drying, the chloroform solution is evaporated over calcined sodium sulphate and the residue is then distilled in a high vacuum. After removing the first runnings, the compound of the formula

EXAMPLE 64

By following the procedure described in the preceding Example and replacing the 4.97 parts of β,β'-diacetoxy-γ,γ'-(N-phenyl-N-ethylamino)-tripropylamine with 5.28 parts of butanediol-di[β-acetoxy-γ-(N-phenyl-N-ethylamino)]propylether, a dyestuff is obtained which dyes polyacrylonitrile an orange-brown shade and corresponds to the formula

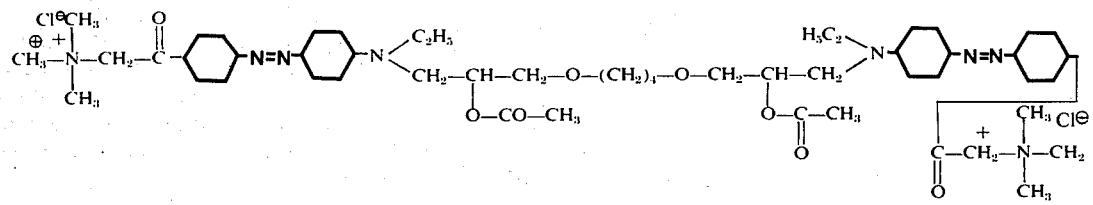

A padding liquor is prepared from 200 parts of the above dyestuff preparation, 100 parts of carboxymethylcellulose (4 percent aqueous solution) and 700 parts of water, the dyestuff preparation described above being stirred into the previously diluted thickener by means of a high-speed stirrer; the pH of the mixture is finally adjusted to 6 by the addition of 80 percent acetic acid. A polyester fibre b fabric is padded in the liquor so prepared at 60 percent expression and then dried at 70° to 80°C. The fabric is heated for 60 seconds on a stenter at 210°C, given a hot wash and then rinsed well with cold water. A violet dyeing possessing good properties of fastness is obtained.

EXAMPLE 65

Dyeing acrylic fibres with a dyestuff of the disperse type

2 Parts of the dyestuff of the formula

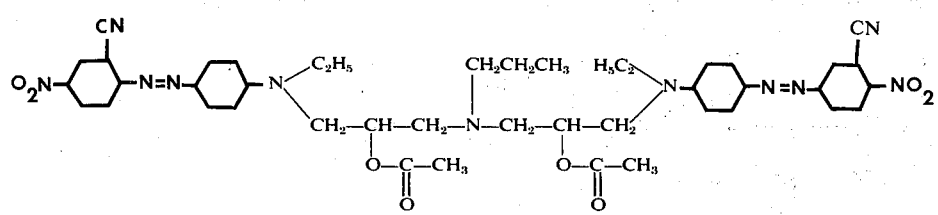

are dissolved in 3,000 parts of water in the presence of 1 part of sodium acetate crystals, 5 parts of calcined sodium sulphate and acetic acid to produce a pH value of 4.5 to 5. 100 Parts of polyacrylonitrile filament yarn are entered into this dyebath at 80°C, the temperature is raised to a maximum of 120°C within 45 minutes and dyeing is carried out for 30 minutes at 120°C. The dyebath is then slowly cooled and the yarn is rinsed. A strong, ruby dyeing possessing excellent fastness to sublimation is obtained.

Dyeing may be produced on acrylic fibres in the manner described above using water-insoluble dyestuffs.

EXAMPLE 66

Dyeing polyester fibres with a disperse dyestuff by the high-temperature process 1 Part of the carbonate of N-[4-(2'-cyano-4'-nitrophenylazo)-phenyl]-N-ethylaminoethanol obtained as above is ground wet with 2 parts of a 50 percent aqueous solution of the sodium salt of dinaphthylmethane-disulphonic acid and the batch is dried.

This dyestuff preparation is mixed with 40 parts of a 10 percent aqueous solution of the sodium salt of N-benzyl-μ-heptadecylbenzimidazole disulphonic acid and then 4 parts of a 40 percent acetic acid solution are added. A dyebath of 4,000 parts is prepared therefrom by dilution with water.

100 Parts of cleaned polyester fibre material are entered into this bath at 50°C, the temperature is raised to 120° to 130°C within half an hour, and dyeing is carried out for one hour in a closed vessel. The material is then well rinsed. A strong, pure, claret dyeing possessing excellent fastness to light and sublimation is obtained.

EXAMPLE 67

Dyeing polyester fibres with a dyestuff of the disperse type by the high-temperature process 1 Part of the dyestuff of the formula

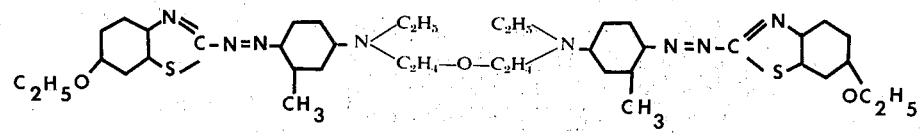

is ground wet with 2 parts of a 50 percent aqueous solution of the sodium salt of dinaphthylmethane-disulphonic acid and the batch is dried.

This dyestuff preparation is mixed with 40 parts of a 10 percent aqueous solution of the sodium salt of N-benzyl-μ-heptadecylbenzimidazole disulphonic acid and then 4 parts of a 40 percent acetic acid solution are added. A dyebath of 4,000 parts is prepared therefrom by dilution with water.

100 Parts of cleaned polyester fibre material are entered into this bath at 50°C, the temperature is raised to 120° to 130°C within half an hour and dyeing is carried out for one hour at that temperature in a closed vessel. The material is then well rinsed. A strong, pure red dyeing possessing excellent fastness to sublimation is obtained.

The dyestuff was obtained in the following manner:-

3.22 Parts of sodium nitrite are introduced into 21.5 parts by volume of concentrated sulphuric acid. The batch is heated to 65°C until a clear solution forms. The solution is then cooled to 0° to 5°C and a mixture of 36.8 parts by volume of glacial acetic acid and 6.13 parts by volume of propionic acid is added, during which the temperature must not exceed 15°C. The batch is then cooled to 0° to 5°C, 8.2 parts of 2-amino-6-ethoxybenzthiazole are added at that temperature, and then a mixture of 36.8 parts by volume of glacial acetic acid and 6.13 parts by volume of propionic acid is again added. The batch is stirred for 3 hours at 0° to 5°C, a small amount of solid sulphamic acid is added and stirring is continued for 30 minutes.

This solution is added dropwise at a temperature not exceeding 10°C to a solution of 68 parts of 2,2'-bis-(N-3''-methylphenyl-N-ethylamino)-diethylether in 400 parts by volume of acetone. The solution is stirred overnight at a temperature of 0° to 10°C. The dyestuff is then precipitated by the addition of a mixture of ice and water, isolated by filtration and washed with water until the washings run neutral. The dyestuff is then dried in vacuo.

EXAMPLE 68

Printing on a polyester fabric

A mixture is prepared from 25 parts of the wet-ground dyestuff of the formula

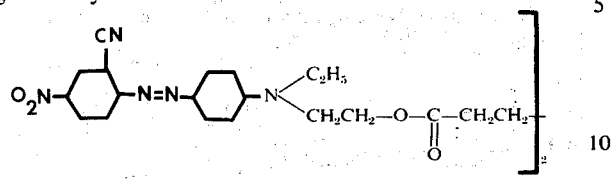

550 parts of an 8 percent aqueous thickener derived from modified locust bean flour, 550 parts of a 10 percent solution of the sodium salt of meta-nitrobenzene sulphonic acid, 10 parts of a mixture of potassium oleate and pine oil, and then bulked to 1,000 parts with water.

The mixture is stirred with a high-speed stirrer until the dyestuff is completely dispersed, and then polyethylene terephthalate is printed with the paste so obtained. After printing, the fabric is dried, steamed for 20 minutes under a pressure of 1.5 atmospheres (gauge), rinsed for 10 minutes in cold water, soaped twice hot in the presence of a small amount of hydrosulphite, rinsed cold and then dried. A fast red print is obtained.

EXAMPLE 69

Continuous dyeing of polyester fabric

20 Parts of N-[4-(2'-cyano-4'-nitrophenylazo)-phenyl]N-ethylamino-ethylsuccinic acid ester are ground in 140 parts of water containing 40 parts of sodium dinaphthylmethanedisulphonate.

We claim:

1. A disazo disperse dyestuff which is free from sulphonic acid groups, of the formula

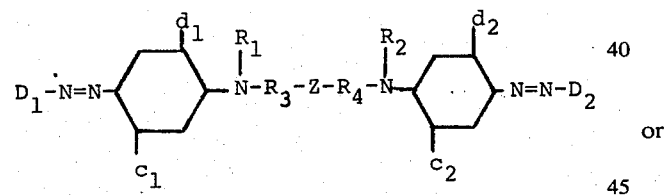

wherein $D_1$ and $D_2$ are each phenyl or phenyl substituted by chloro, bromo, cyano, thiocyano, nitro, methyl, ethyl, trifluoromethyl, methoxy, ethocy, $C_1$-$C_2$ alkylated aminosulfonyl, (hydroxyethyl)-aminosulfonyl, cyanoethylaminosulfonyl, β-chloroethylsulfonylamino, phenylaminosulfonyl, aminosulfonyloxy, $C_1$-$C_4$ alkylated aminosulfonyloxy, phenyl, acetylaminophenyl, phenoxy, phenylazo, nitrophenylazo, carbomethoxy or trimethylammoniummethylcarbonyl;

$R_1$ and $R_2$ each are hydrogen, alkyl of up to 4 carbon atoms, or alkyl of up to 4 carbon atoms substituted by a member selected from the group consisting of chloro, bromo, phenyl, $C_1$-$C_4$ alkylcarbonyloxy, $C_1$-$C_4$ alkylcarbonylamino, hydroxy, cyano, $C_1$-$C_4$ alkoxy, benzoyl, cyanoethoxy, $C_1$-$C_4$ alkylcarbamoyl, aminocarbonyl and $C_2$-$C_4$ alkyloxycarbonyloxy;

$d_1$, $d_2$, $c_1$ and $c_2$ each are hydrogen, methyl, ethyl, methoxy, ethoxy, phenylthio or phenoxy;

$R_3$ and $R_4$ are each alkylene of up to 3 carbon atoms,

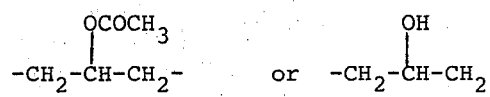

such that where $R_3$ and $R_4$ are each

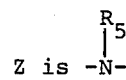

Z is $-\overset{R_5}{\underset{|}{N}}-$ where $R_5$ is p-tolyl, p-methylcarbonylaminophenyl, phenyl or $C_1$-$C_3$ alkyl; or is -X'-Z'-X'- where X' is —O— or —NH— and

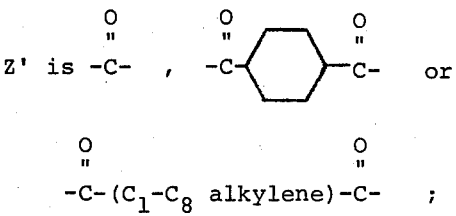

and where $R_3$ and $R_4$ are not each

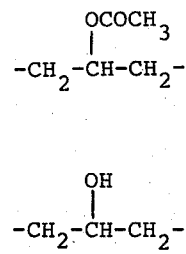

Z is 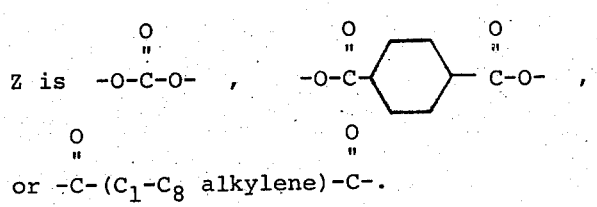

or $-\overset{O}{\overset{\|}{C}}-(C_1-C_8 \text{ alkylene})-\overset{O}{\overset{\|}{C}}-$.

2. A dyestuff according to claim 1 in which $D_1$ and $D_2$ are identical and stand for

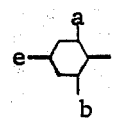

in which $a$ is hydrogen, chlorine, bromine, methyl, methoxy, phenoxy, nitro, cyano, carbomethoxy or methylsulphonyl, $b$ is hydrogen, bromine, chlorine, methyl, cyano, or trifluoromethyl, and $e$ is nitro, bromine, chlorine, cyano, hydrogen, carbomethoxy, methylsulfonyl or trimethylammoniummethylcarbonyl.

3. A disazo dyestuff as claimed in claim 2 of the formula

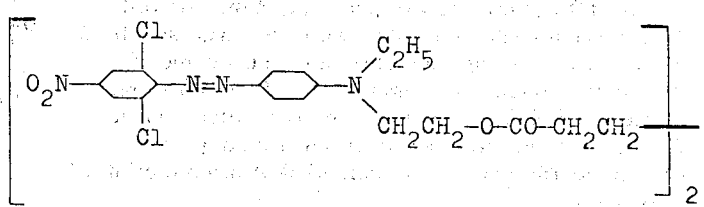

4. A disazo dyestuff according to claim 2 of the formula

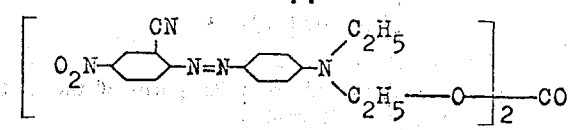

5. A disazo dyestuff according to claim 2 of the formula

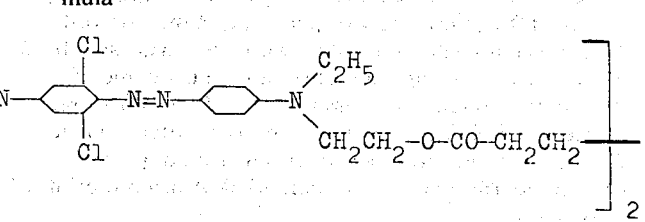

* * * * *